(12) United States Patent
Reiners et al.

(10) Patent No.: US 12,257,855 B2
(45) Date of Patent: Mar. 25, 2025

(54) INKJET PRINTED FILM FOR DECORATIVE APPLICATIONS

(71) Applicant: Sihl GmbH, Düren (DE)

(72) Inventors: Arthur Reiners, Erkelenz (DE); Axel Niemöller, Düren (DE); Klaus Götzen, Bonn (DE); Stefan Bruch, Simmerath (DE); Steffen Ohr, Sursee (CH)

(73) Assignee: Sihl GmbH, Düren (DE)

( * ) Notice: Subject to any disclaimer, the term of this patent is extended or adjusted under 35 U.S.C. 154(b) by 592 days.

(21) Appl. No.: 17/595,294

(22) PCT Filed: May 15, 2020

(86) PCT No.: PCT/EP2020/063570
§ 371 (c)(1),
(2) Date: Nov. 12, 2021

(87) PCT Pub. No.: WO2020/229647
PCT Pub. Date: Nov. 19, 2020

(65) Prior Publication Data
US 2022/0258513 A1  Aug. 18, 2022

(30) Foreign Application Priority Data
May 16, 2019  (EP) .................... 19174796

(51) Int. Cl.
*B41M 3/06* (2006.01)
*B41M 5/50* (2006.01)
*B41M 5/52* (2006.01)
*B41M 7/00* (2006.01)
*C09D 11/322* (2014.01)

(52) U.S. Cl.
CPC .............. *B41M 3/06* (2013.01); *B41M 5/508* (2013.01); *B41M 5/5209* (2013.01); *B41M 5/5218* (2013.01); *B41M 5/5254* (2013.01); *B41M 7/0027* (2013.01); *B41M 7/0045* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 5,635,291 A | * | 6/1997 | Yoshino | ............... C09D 17/004 |
| | | | | 428/323 |
| 5,955,185 A | * | 9/1999 | Yoshino | ............... B41M 5/5218 |
| | | | | 428/32.33 |
| 6,000,794 A | * | 12/1999 | Kondo | ................. B41M 5/5218 |
| | | | | 428/323 |

(Continued)

FOREIGN PATENT DOCUMENTS

| DE | 4446551 C1 | 3/1996 |
|---|---|---|
| DE | 10 2017 203 917 A1 | 9/2018 |

(Continued)

OTHER PUBLICATIONS

International Search Report issued for International Patent Application No. PCT/EP2020/063570, dated Sep. 7, 2020 in 4 pages.

(Continued)

*Primary Examiner* — Manish S Shah
(74) *Attorney, Agent, or Firm* — Knobbe, Martens, Olson & Bear, LLP

(57) ABSTRACT

An inkjet printed flexible film for decor applications is provided. In particular the present invention relates to an inkjet printed flexible film comprising a polymer film and an ink-receptive layer comprising polymerizable and/or cross-linkable compounds or a polymer crosslinked via (meth)acrylate moieties. Ink pigments can be applied to the ink-receptive layer in a print pattern by ink jet printing. The ink-receptive layer can be printed by means of industrial digital inkjet printing. The decor applications include any decorated surfaces for flooring, wall covering, furniture, ceilings and the like.

20 Claims, No Drawings

(56) References Cited

U.S. PATENT DOCUMENTS

| | | | |
|---|---|---|---|
| 6,166,122 A * | 12/2000 | Tanuma | B41M 5/52 524/430 |
| 6,238,047 B1 * | 5/2001 | Suzuki | B41M 5/506 347/100 |
| 7,585,553 B2 | 9/2009 | Burch et al. | |
| 7,906,187 B2 | 3/2011 | Bi et al. | |
| 2002/0044186 A1 * | 4/2002 | Tochihara | C09D 11/322 347/100 |
| 2003/0112311 A1 * | 6/2003 | Naik | B41M 5/52 347/105 |
| 2004/0091645 A1 * | 5/2004 | Heederik | B41M 5/52 428/32.1 |
| 2004/0247804 A1 | 12/2004 | Kim et al. | |
| 2005/0058784 A1 | 3/2005 | Kaga | |
| 2008/0057231 A1 * | 3/2008 | Li | B41M 5/52 428/32.18 |
| 2018/0155937 A1 | 6/2018 | Clement | |

FOREIGN PATENT DOCUMENTS

| | | |
|---|---|---|
| EP | 0 634 286 B1 | 3/1997 |
| EP | 0 916 512 A2 | 5/1999 |
| EP | 0 997 314 A1 | 5/2000 |
| EP | 916512 B1 * | 7/2001 ............ B41M 5/52 |
| EP | 1 491 351 A1 | 12/2004 |
| EP | 1 644 348 A1 | 4/2006 |
| EP | 2 382 124 A1 | 11/2011 |
| EP | 1 861 258 B1 | 12/2014 |
| EP | 2 865 527 A1 | 4/2015 |
| EP | 2 828 092 B1 | 2/2016 |
| EP | 3 095 613 A1 | 11/2016 |
| EP | 3 199 360 A1 | 8/2017 |
| EP | 3 381 707 A1 | 10/2018 |
| EP | 3 415 337 A1 | 12/2018 |
| JP | S59-190885 A | 10/1984 |
| JP | H8-99458 A | 4/1996 |
| JP | 2007-44935 A | 2/2007 |
| JP | 3944315 B2 | 7/2007 |
| WO | 2009/077561 A1 | 6/2009 |
| WO | 2014/147171 A1 | 9/2014 |
| WO | 2015/104249 A1 | 7/2015 |
| WO | 2016/066531 A1 | 5/2016 |
| WO | 2018/021572 A1 | 2/2018 |
| WO | 2018/074448 A1 | 4/2018 |
| WO | 2018/141915 A1 | 8/2018 |

OTHER PUBLICATIONS

Written Opinion issued for International Patent Application No. PCT/EP2020/063570 in 12 pages.

* cited by examiner

INKJET PRINTED FILM FOR DECORATIVE APPLICATIONS

CROSS-REFERENCE TO RELATED APPLICATIONS

This application is the U.S. National Phase under 35. U.S.C. § 371 of International Application PCT/EP2020/063570, filed May 15, 2020, which claims priority to European Patent Application No. 19174796.3, filed May 16, 2019. The disclosures of the above-described applications are hereby incorporated by reference in their entirety.

FIELD OF THE INVENTION

The present invention is directed to a flexible film which is inkjet printable or inkjet printed for decoration applications. In particular the present invention relates to a flexible film comprising a polymer film, an ink-receptive layer and a polymer crosslinked via (meth)acrylate moieties. Ink pigments can be applied to the ink-receptive layer in a print pattern by ink jet printing. The ink-receptive layer can be printed by means of industrial digital inkjet printing.

BACKGROUND OF THE INVENTION

Currently filmic furniture decor surfaces are printed in the traditional gravure printing process, e.g. on coloured, e.g. on brownish for wood imitation, coronated and/or primed cast polypropylene (cPP) films, polyester films (PET) or polyvinylchloride (PVC) films. However, special biaxially oriented polypropylene (BOPP) films as well as biaxially oriented polyester (BOPET) films have also been established. The thickness of the raw films usually is between 12 µm and 500 µm, typically between 30 µm and 300 µm. Also, transparent cast polypropylene film (cPP) with reverse print decoration is being used.

Inkjet printing is widely used for various applications on substrates provided both in standard sheets and on roll. Nowadays, papers and films with microporous ink-receiving layers are common and described in the prior art.

EP 0 634 286 B1 concerns an alumina sol coating fluid containing an alumina hydrate, such as boehmite, a polyvinyl alcohol and boric acid or a borate for forming an ink-receiving layer of a recording sheet to be primarily used as a transparency for overhead projection.

EP 1 644 348 A1 relates to a process for preparing a dispersion of surface-modified silica by modifying the surface of the silica with the reaction products of an Al(III) compound and an aminosilane. Also described is a recording material comprising an ink-receiving layer containing said dispersion and a binder, e.g. polyvinyl alcohol.

U.S. Pat. No. 7,585,553 B2 is directed to a recording sheet for inkjet photo printing comprising a support layer, such as a transparent film, a basecoat layer comprising an alumina-based composition containing a binder like polyvinyl alcohol and a topcoat layer comprising a colloidal cationic silica composition. Preferably, the basecoat comprises pseudo-boehmite. It is taught that in the printed sheet a high amount of color is maintained in the topcoat since the cationic silica serves to hold the anionic dye of the printing ink, whereas the lower alumina-containing basecoat serves to attract the solvent of the printing ink. In the examples the basecoat is applied with coating weights of more than 40 g/m$^2$.

U.S. Pat. No. 7,906,187 B2 describes an inkjet printing medium for near-photographic prints comprising a polyethylene-based substrate, a first ink-receiving layer containing a cationic silica and a binder, e.g. polyvinyl alcohol, and a second gloss-enhancing layer containing a second cationic silica.

EP 1 861 258 B1 is directed to a process for preparing an inkjet printable microporous medium for indoor and outdoor graphic displays, selected from paper or film, comprising a substrate, an intermediate layer comprising a specific mixture of acrylic (co)polymers, and an ink-receptive topcoat. The porous ink-receptive topcoat comprises inorganic particles and a polymeric binder. In the examples PET films having a thickness of 96 µm are coated with an intermediate layer and an ink-receptive top layer comprising boehmite and a poly(vinyl alcohol) binder.

WO 2018/021572 A1 concerns an inkjet recording medium comprising a transparent support and a transparent porous layer containing inorganic particles, preferably selected from silica, alumina, and pseudo-boehmite.

EP 3 199 360 A1 describes an ink jet printable coated media base on paper as well as on thermoplastic film with a first ink jet coating and a second ink jet coating on top of the first ink jet coating both based on boehmite particles. The second ink jet coating comprises more polyvinyl alcohol binder than the first coating in order to overcome brittleness and dusting issues related to the low binder content in the first coating.

Also, the ink jet printing has been described for decorative applications:

WO2014/147171 A1 describes a method for the production of decorative boards by applying a colored, e.g. white primer, e.g. based on water born acrylic polymer, printing with aqueous ink jet inks and applying a UV curing top coat directly to the board, e.g. comprising gypsum, cellulosics or rock wool. The UV curing top coat is applied on top of the decorative print layer.

US 2018/0155937 A1 discloses a method for decorative ink-jet printing of films with aqueous inks followed by lamination of the printed side to a second film. Particularly, the films may be comprised of polyvinyl chloride as typically used for luxury vinyl tiles (LVT). An ink acceptance layer is not applied which leads to print artefacts like coalescence of ink droplets before drying.

EP 3 095 613 A1 describes the same application as the previous patent application but additionally claims pressing and cutting the printed film to obtain a decorative panel.

EP 3 415 337 A1 describes conventional porous ink jet receptive coatings, e.g. based on silica pigments with a particle size between 2 and 7 µm, for application on decor papers or films. The printed paper is saturated by a melamine resin for further processing to the final decorative board.

Decorative papers as base material for aqueous inkjet printing are described in a number of patents, e.g. WO2016/066531 A1, EP 2 828 092 B1, WO2015/104249 A1, EP 2 865 527 A1, DE102017203917 A1, WO2018/141915A1, WO2009/077561 A1.

There are several patents and applications which aim at improving the water resistance of microporous ink jet coatings:

US 2004/0247804 A1 (Samsung) describes the addition of a cationic core-shell latex with a Tg>50° C. and a zirconium compound with the aim of a higher moisture resistance at high temperature.

EP 3 381 707 A1 (Canon) uses a boehmite-based microporous inkjet coating comprising water-insoluble binders (polyacrylates, polyurethanes, etc.) to ensure water resistance for outdoor use. Various Boehmite qualities from Sasol (Disperal grades HP15 to HP80) are used as pigments.

The adhesion of pigmented inks is achieved by a defined surface roughness Ra, which must be between 30 nm and 150 nm.

EP 1 491 351 B1 (Mitsubishi), WO2018/074448 A1 (Japan VAM & Poval) and JP3944315 reveal the crosslinking of carbonyl-containing polyvinyl alcohol with diamines in ink jet coatings. Particularly, crosslinking with di-hydrazides is preferred.

Crosslinking of a modified polyvinyl alcohol in microporous ink-jet coatings by radiation curing is described e.g. in US 2005/0058784 A1 (Konica), including e.g. styrylpyridinium pendant groups. Crosslinking is achieved by dimerizing these pendant groups.

EP 2 382 124 A1 describes an ink receiving layer containing an acetoacetic ester group-containing polyvinyl alcohol resin crosslinked by a glyoxylate on a supporting base in order to gel the coating. Also, microporous coatings based on colloidal silica, vapor phase silica, wet silica, alumina or the like is described. The particle diameter thereof is in terms of the average particle diameter preferably from 3 to 500 nm.

Although microporous ink jet coatings as described in the literature provide excellent printing results they have severe drawbacks for decorative applications. Due to the state-of-the-art microporous structure and the components necessary, these ink jet coatings have a low binder content, are hydrophilic and swellable and therefore prone to mechanical weakness in dry and particularly in humid or wet conditions. Water penetration into the coating leads to softening of the coating due to the used water sensitive binders, particularly polyvinyl alcohols. This results in mechanical problems if these coatings are used in decorative applications, e.g. at unsealed edges or by diffusion of water or other substances through a top coating or through pores present in a top coating. So, none of these known coatings printed by water-based ink jet inks are able to fulfill the strong requirements for decorative surfaces.

SUMMARY OF THE INVENTION

Although various inkjet recording media are described in the art, there is still a need for mechanically resistant material that is printable or printed with aqueous pigmented inks (used in ink jet printing) and results in high quality mechanically and chemically resistant and particularly water-resistant printed film products. The printed film should be able to be readily processed further to the final decorative application. Particularly, the requirements the printed ink jet film should fulfill are: a high internal cohesion of the various layers and a high adhesion between these layers, especially between the coatings and the film base, in the dry state as well as under humid or wet conditions. It also has to fulfill high lightfastness requirements for long term indoor decorative applications.

Furthermore, the printed flexible film should be printable on high speed single-pass ink jet printers from roll-to-roll and should provide enough flexibility to be processed further to allow the production of e.g. printed rigid boards and it has to conform to the surface of a board or panel by lamination, e.g. also in two-dimensional (2D) applications, e.g. where it is wrapped around the edge of a board or panel.

For this reason, the state-of-the art coatings do not fulfill all of these requirements, particularly there is a need for improvement of such printed ink jet films to be much more resistant to moisture and to water.

This need is met by a flexible film comprising:
(a) a polymer film having a thickness in the range of from 30 to 500 μm; and
(b) at least one ink-receptive layer comprising inorganic particles and a binder
wherein said ink-receptive layer (b) further comprises more than 6% by weight based on the weight of the ink receptive layer of polymerizable and/or crosslinkable monomeric or polymeric compounds having at least one (meth)acrylate moiety or a polymer which is crosslinked via (meth)acrylate moieties.

The flexible film preferably is ink jet printed by use of inkjet inks, in particular by use of aqueous inkjet inks.

Accordingly, the present invention refers in particular to an ink jet printed flexible film suitable for decorative applications comprising:
(a) a polymer film having a thickness in the range of from 30 to 500 μm; and
(b) at least one ink-receptive layer comprising inorganic particles and a binder
(c) pigments of an inkjet ink
wherein said ink-receptive layer (b) further comprises more than 6% by weight based on the weight of the ink receptive layer of polymerizable and/or crosslinkable monomeric or polymeric compounds having at least one (meth)acrylate moiety or a polymer which is crosslinked via (meth)acrylate moieties.

The flexible film of the present invention can also be printed when provided on the market, e.g. printed by a decorative pattern, a design or a picture. Therefore, the present invention refers further to an ink jet printed flexible film, e.g. for decorative applications comprising:
(a) a polymer film having a thickness in the range of from 30 to 500 μm; and
(b) at least one ink-receptive layer comprising inorganic particles and a binder
wherein said ink-receptive layer (b) further comprises (i) more than 6% by weight based on the weight of the ink receptive layer of polymerizable and/or crosslinkable monomeric or polymeric compounds having at least one (meth)acrylate moiety or a polymer which is crosslinked via (meth)acrylate moieties and (ii) pigments of an inkjet ink.

In a preferred embodiment of the printed flexible film the pigments of the inkjet ink are present on top of the ink-receptive layer (b). This is obtainable by applying the ink to the microporous layer comprising at least the inorganic particles and a binder, which quickly absorbs the applied ink liquid and fixes the ink pigments on top of the ink receptive coating.

Further it is preferred that in the printed flexible film the pigments of the ink provided on top of the ink-receptive layer (b) are in close contact with or even bound by the polymerizable and/or crosslinkable monomeric or polymeric compounds having at least one (meth)acrylate moiety or a polymer which is crosslinked via (meth)acrylate moieties. This can be obtained by applying a liquid comprising said polymerizable and/or crosslinkable monomeric or polymeric compounds having at least one (meth)acrylate moiety after printing the microporous layer with pigmented inkjet ink. Methods for applying the liquid comprising said polymerizable and/or crosslinkable monomeric or polymeric compounds having at least one (meth)acrylate moiety are described in detail below.

It should be understood that according to the present disclosure the term "ink-receptive layer" refers to a layer, which is able to receive ink and to absorb at least a part, preferably all of the liquid portion of the ink. The term "ink-receptive layer" refers also to the same layer after having received ink, i.e. after having absorbed ink liquid, even if said layer is further treated and is thereafter not able to receive further ink. Thus, the term "ink-receptive layer" refers throughout the whole disclosure to the same layer of the flexible film, either before or after ink application (absorbance), independent from whether said layer can absorb further ink. The terms "receptive" and "receiving" should be considered as synonyms, including the meaning "has received".

The present invention is also directed to a printed multilayer laminate comprising the inkjet printed flexible film attached to a further substrate. Such a further substrate may be as well flexible, however, preferably is a rigid board or panel e.g. to form a multilayer laminate for decorative applications.

The present invention further concerns the use of the flexible film and the multilayer laminate in order to provide decorated surfaces e.g. for flooring, furniture, walls, ceilings or the like.

Furthermore, the present invention refers to a method of manufacturing the flexible film by
  (i) coating a polymer film having a thickness in the range of from 30 to 500 μm with a mixture comprising inorganic particles and a binder to provide at least one ink receptive layer(s) on the polymer film
  (ii) including or applying polymerizable and/or crosslinkable compounds having at least one (meth)acrylate moiety into the ink receptive layer
      preferably comprising
  (iii) polymerizing and/or crosslinking the (meth)acrylated compounds contained in or applied to the ink receptive layer by applying radiation energy to obtain a polymer crosslinked via (meth)acrylate moieties.

Moreover, the present invention relates to a method of manufacturing an inkjet printed film by additionally (iv) applying pigmented aqueous ink in a desired print pattern or design by ink jet printing. The order of manufacturing steps may be changed, particularly step (iv) may be carried out before step (ii), before step (iii) or after step (iii).

In a particularly preferred embodiment the step of applying pigmented aqueous ink is carried out before step (ii). Further, it is preferred that step (ii) is carried out by applying polymerizable and/or crosslinkable compounds having at least one (meth)acrylate moiety onto the printed ink receptive layer to allow inclusion of said compounds into said layer (by absorption).

The inventive inkjet printed flexible film comprising the ink receptive layer has a high print quality, particularly high resolution without print artefacts, at high speed printing, is flexible and has excellent mechanical stability. It exhibits a high cohesion and adhesion of the ink receptive coating, the applied ink and the base film, optionally provided with a primer coating, as required for decorative applications. The flexible film can be manufactured by high speed coating processes and can be printed via high speed inkjet printing. It was surprisingly found that despite the porosity of the coating needed for ink uptake, the inventive inkjet printed flexible film withstands strong mechanical impact, i.e. shows dry peel resistance, peel resistance under humid or wet conditions as well as flex-crack and flake-off resistance when cut or applied around corners of a rigid board.

Moreover and quite importantly, the inkjet printed multilayer film is resistant to light and chemicals like solvents, plasticizers etc. and can be laminated with glue and a heat press onto rigid substrates e.g. by low pressure lamination process (LPL) or continuous pressure lamination (CPL) onto plywood, medium density fiberboard (MDF), high density fiberboard (HDF), reinforced gypsum panels, rock wool containing boards as well as foam boards, e.g. made of polyurethane or metal plates.

The decorated boards may be further processed to obtain e.g. flooring tiles, furniture surfaces, furniture boards, doors etc., particularly for applications where a high resistant surface is needed e.g. for bath, kitchen, public buildings, hotels, shipbuilding, without being restricted to the mentioned.

According to this invention the printed film comprising the decor print furthermore comprises a radiation curable compound at least partly present inside the pores of the ink receptive coating, wherein said curable compounds are cured by UV light or by electron beam radiation (EB). The inventive (printed) film may be further processed or coated with a top coat laquer, e.g. a UV or EB curable laquer or by co-extrudion of a plastic film e.g. based on polyurethanes for flooring boards in order to apply a wear layer. The printed film may be glued e.g. onto MDF or HDF boards, e.g. by means of a CPL process or a membrane press. This process is suitable for 1D (one-dimensonal) and 2D (two-dimensional) applications. In 2D applications, the films are glued around edges or corners. These wrap-around applications are very common e.g. for skirting boards, picture frames or phono furniture.

DETAILED DESCRIPTION OF THE INVENTION

The present invention is dedicated to provide a film suitable e.g. for the decor printing industry. The film can be printed by water based pigmented inks and provides high resistance against humidity and water. It fulfils end-use specific physical strength properties, e.g. peel resistance or delamination strength of minimum 20 N/25 mm, preferably more than 30 N/25 mm, e.g. as needed for flooring applications. Preferably, the film is printed by industrial high-speed inkjet printing machines. Digital printing offers the possibility of endless and randomly designed (e.g. combination of stone and wood image) decor materials and therefore solves the limitation of standard gravure printing where the repetition of the pattern is typically in range of 1.3 m-1.5 m length in print direction.

The present invention refers to a flexible film, which is inkjet printable, in particular to an inkjet printed flexible film, to a method of manufacturing such a film, the use of said flexible film for preparing a laminate and a multilayer laminate comprising said inkjet printed film, as defined in the claims.

Polymer Film (a)

The flexible film according to the invention comprises a polymeric film (a) as a preferably non-porous substrate on which the ink-receptive layer(s) (b) is/are coated. Optionally, a primer layer between the film (a) and the (first) ink receptive layer (b) is applied, particularly in order to improve the dry and wet adhesion between these layers.

The polymer film (a) can be made of any polymeric material that can be processed to a film and can be non-oriented, uniaxially or biaxially oriented. Typically, the polymer film comprises a thermoplastic material. Useful thermoplastic materials include polyvinylchloride, polyesters, polyolefins, polystyrenes, polyamides, polyacrylates, polycarbonates, derivates of cellulose such as cellulose triacetate, biodegradable polymers such as starch and poly (amino acid)s, and blends and copolymers of these polymers. Suitable polymer films are commercially available.

In preferred embodiments the thermoplastic material is selected from the group consisting of polyesters, polyolefins, and polyvinylchloride. More preferably the thermoplastic material is selected from the group consisting of polyesters, even more preferably poly(ethylene terephthalate)s, poly (ethylene naphthalate)s, and polyolefins, even more preferably polypropylene and its copolymers. The most preferred polymer films are non-oriented cast polypropylene (cPP) or biaxially oriented polypropylene (BOPP) such as BOPP films, e.g. available at Innovia under the tradename Rayoface e®, at Tagleef under the tradename SynDecor®, at Jindal under the tradename Label-Lyte™ or at RKW under the tradename Aptra®, biaxially oriented poly(ethylene terephthalate) (BOPET) such as BOPET films available from Mitsubishi under the tradename Hostaphan® and from DuPont under the tradenames Mylar® and Melinex®. cPP films are available from Profol under the tradename profol ®. Preferably the films may comprise UV stablilisation features.

The preferred biaxially oriented polymer films also have a high tensile strength and high thermal stability, particularly a melting point of above 135° C. as can be determined by DSC measurements. Exemplary tensile strength at break values (measured according to ASTM D-882) for a 60 μm thick BOPP film in machine and cross direction are between about 50 MPa and 200 MPa. Exemplary tensile strength values for a 100 μm thick BOPET film in machine and cross direction are about 150 MPa mm and 250 MPa.

Suitable not biaxially oriented polymer materials for the polymer film (a) include polyamide, polyethylene, e.g. high density (HDPE) or low density polyethylene (LDPE), polypropylene (e.g. cPP), amorphous poly(ethylene terephthalate) (APET), glycol-modified poly(ethylene terephthalate) (PET-G), and polylactide (e.g. cPLA). These films can be produced e.g. in a cast extrusion process (designated with a "c") or blow extrusion process. An example of a coextruded not biaxially oriented polymer film (a) is a film comprising an inner layer of PP and outer layer(s) improving film properties such sealing properties, coefficient of friction, adhesion to adhesives, coatings or printing. Also, combinations of polymer films can be used in form of a multilayer film laminate including combinations of the above mentioned e.g. obtainable by lamination of two or more films as substrate for the ink jet coating.

Coextruded polymer films wherein the first layer is a homopolymer as described above and having at least one further top layer of a polymer having better adhesion towards the ink-receptive layer (b). e.g. made of a propylene/ethylene copolymer, are preferred.

The polymer film (a) can be transparent, translucent or opaque, wherein white, opaque or colored, e.g. light to dark brown as base color for wood designs is preferred. Suitable white films can be foamed, cavitated, or pigmented in the mass, e.g. with a white pigment as titanium dioxide, barium sulfate or calcium carbonate. The surface(s) of the polymer film can be treated, e.g. by corona treatment, flame treatment, or chemical treatment. The treatment of the surface can have various effects such as an improvement of wettability and adhesion to the adjacent primer or ink-receptive layer, especially in the case of cPP, BOPP, HDPE, LDPE and PET films, and thus results in an increase of composite strength.

The thickness of the polymer film (a) is within the range from 30 μm to 500 μm, preferably from 50 μm to 300 μm and more preferably from 70 μm to 250 μm.

Ink Receptive Layer (b)

According to the invention the flexible film comprises at least one ink receptive layer. If the flexible film comprises more than one ink receptive layers, at least one, in particular the one furthest away of them from the supporting film has the features and properties described herein for the ink receptive layer (b). Further ink receptive layers of the flexible film might have another composition or differing features, however, according to the present invention at least one ink receptive layer (b) is present in the flexible film. The ink-receptive layer (b) is applied on at least one surface of the polymer film (a) and comprises inorganic pigment particles, preferably of boehmite, alumina and/or silica in order to achieve a high porosity microporous structure for fast ink uptake in the printing process and a binder polymer as defined below. Preferably, microporous coatings based on fine particles based on boehmite or fumed silica are used.

The ink receptive layer (b) can be in direct contact with the polymer film (a), or there might be further layers applied between the ink receptive layer (b) and polymer film (a). One example for a further layer is a primer layer improving the adhesion between the polymer film (a) and the ink receptive layer (b).

Furthermore, after printing the ink receptive layer (and after including the polymerizable and/or crosslinkable compounds having at least one (meth)acrylate moiety or the already polymerized compounds) can be coated by further layers, e.g. any extrusion layers, laquer layer(s), any layer(s) increasing the abrasive resistance, adhesive layer(s) or any combination thereof, without being limited the these, Furthermore, some of these layers may be provided to the other surface of the polymeric film (a), thus, the flexible film of the present invention can comprise any of the mentioned layer (combination) in any order on one of or both of the surface(s) of the polymeric film (a), however, comprises in any case at least one ink receptive layer (b).

The ingredients and features of the ink receptive layer (b) are described below in detail.

Inorganic Particles

According to the invention the ink receptive layer (b) can comprise any inorganic particle suitable and/or commonly used in ink receiving coatings, in particular in coatings provided to be printed by inkjet prints with aqueous inkjet inks. The suitability for this approach originates from the ability of the particles to provide a high porous microporous coating. With "high porous" or "high porosity" is meant that the coating has a porosity of at least 0.3 to 1.5 ml/g, or 0.35 to 1.2 ml/g, preferably 0.4 to 1 ml/g, or 0.45 to 0.9 ml/g, more preferably 0.5 to 0.8 ml/g. Thus, it is preferred that the microporous layer (b) has a porosity of at least 30% by volume, preferably in the range of 40 to 70 vol. %. A method for measuring said porosity (pore volume) is described below. With "microporous" is meant that the pores between the (primary) particles, within particle aggregates and/or the particles and the binder (before the ink receptive layer (b) is printed with ink pigments) have a pore size (diameter) in the range of from 2 nm to less than 0.5 μm, preferably in range of from 5 nm to less than 0.2 μm, even more preferred in the range from 10 nm to 100 nm as can be measured by mercury intrusion porosimetry.

The particle size of the inorganic particles preferably is in the following range: The primary particle size might be from 5 to 100 nm, preferably from 7 to 80 nm, more preferred from 8 to 60 nm, even more preferred from 9 to 50 nm and most preferred from 10 to 30 nm. The primary aggregate particle size might be from 30 to 300 nm, preferably from 40 to 250 nm, more preferred from 50 to 200 nm and most preferred from 60 to 180 nm. The "primary aggregate" is represented by the aggregation of several primary particles, providing pores between said primary particles within said aggregate.

Inorganic particles according to the invention for preparing the ink receptive layer (b) comprise aluminum oxides, aluminum oxide hydroxide, e.g. boehmite or pseudoboehmite, and hydroxides, fumed (vapor phase) silica, colloidal silica, e.g. Cartacoat$^®$ or Cartacoat$^®$, cationic silicas offered by Archroma, or Snowtex$^®$ silica dispersions offered by Nissan, precipitated silica and gel type silica and calcium carbonate, e.g. offered by Omya. The particles may comprise other inorganic components and may be surface modified by inorganic or organic compounds.

Preferred inorganic particles according to the invention are boehmite, fumed silica and alumina, particularly preferred are boehmite and fumed silica.

Suitably, the inorganic particles for preparation of the ink receptive layer (b) have a BET surface of 100 to 350 m$^2$/g, preferably 100 to 300 m$^2$/g, even more preferred 100 to 250 m$^2$/g.

Boehmite

Boehmite is a mineral of aluminum with an orthorhombic unit cell (a=3.693° A, b=12.221° A, and c=2.865° A), classified as aluminum oxide hydroxide ($\gamma$-AlO(OH) (=Al$_2$O$_3$*H$_2$O)). Boehmite with an increased spacing in the [010] direction is referred to as pseudoboehmite and amorphous boehmite is usually referred to as gel. Pseudoboehmite is characterized by a higher water content (Al$_2$O$_3$*x H$_2$O(1.0<x<2.0). Boehmite can be found in nature or precipitated and grown from solution of aluminum salts and alumina under hydrothermal conditions. Boehmite particles within the meaning of the present invention are small primary aggregates of boehmite crystallites.

The size (d$_{50}$, volume mean) of the boehmite crystallites in the dry powder can, for example, be in the range of from 7 to 80 nm, preferably from 8 to 50 nm, and more preferably from 10 to 20 nm, as determined by X-ray diffraction on X-ray diffractometers supplied by Siemens or Philips.

The small primary aggregates of boehmite crystallites can be obtained by dispersion of secondary larger agglomerates of boehmite crystallites having a mean particle size in the range of from 1 μm to 100 μm present in commercially available boehmite powders, e.g. as delivered from a spray drying process.

The dispersed boehmite particles (small primary aggregates of boehmite crystallites) typically have a particle size (d$_{50}$, volume mean) in the range of from 30 nm to 300 nm, preferably from 50 nm to 200 nm, more preferably from 80 to 180 nm, as determined by photon correlation spectroscopy on Beckmann, Malvern, Horiba or Cilias instruments after dispersion of the boehmite powder in acidic solution (10 weight % of Al$_2$O$_3$ in 0.4 weight % of HNO$_3$). The particles size distribution is preferably unimodal.

The primary aggregates have a porous structure. Typically, the boehmite particle aggregates have an average pore volume of from 0.5 to 1.5 ml/g, preferably from 0.8 to 1.3 ml/g. Typically, the boehmite particle aggregates have a BET surface area of from 100 to 200 m$^2$/g, preferably from 120 to 180 m$^2$/g. The average pore volume and the BET surface area are determined by gas adsorption according to DIN 66135-1 on the powder after calcination at 550° C. for 3 h.

Suitable commercially available boehmite powders to be used in the ink-receptive layer (b) include DISPERAL® and DISPAL® grades available from Sasol, e.g. HP8, HP10, HP 14, HP18, HP 22, HP30 and HP80, preferably HP 14, HP 18, HP22.

Fumed Silica

Alternatively, the porous structure suitable for high speed ink uptake can be achieved by fumed silica particles, e.g. Aerosil® 200, Aerosil® 255, Aerosil® 300 from Evonik, Cab-o-Sil® M-3, Cab-o-Sil® M-5 from Cabot and HDK® grades from Wacker. Suitable silicas have a very small primary particle size in the range of 7 nm to 40 nm and a high specific surface area of from 100 m$^2$/g to 400 m$^2$/g, preferably 200 m$^2$/g to 300 m$^2$/g. These silica particles have an anionic, hydrophilic surface and should be cationic modified to obtain dispersible silica particles, as described below.

Alumina

Furthermore, alumina fine particles can be used in a microporous coating, e.g. fumed alumina like Alu-oxide C® from Evonik.Particularly, Aerodisp® W type dispersions based on pyrogenic alumina from Evonik are suitable for the inventive microporous ink jet printable coatings, e.g. Aerodisp® W 925, Aerodisp® W 630, Aerodisp® W 440.

Also, mixtures of the above mentioned fine particles can be used.

Binder

As a binder system according to the invention any binder system known to allow the formation of a porous structure in ink receptive layers can be used. There is no particular limitation concerning the binder system, as long as the "high porous microporous" structure of the invention can be obtained. Binders for use in preparing ink receptive layers are well known in the art. Water soluble binders comprise polymers and copolymers based on polyvinyl alcohol, polyethyleneoxide, polyvinylmethylether, water soluble (meth) acrylic polymers, water soluble cellulose derivatives as methylcellulose, ethylcellulose, carboxymethylcellulose, and polyvinylpyrrolidone. Polymer dispersions can also be used as sole binder or in combination with water soluble polymers. These dispersions may be based on SBR-latex, PU-dispersions, meth(acrylate)dispersion, EVA-dispersion or others.

According to the invention the polymeric binder poly (vinyl alcohol) or a poly(vinyl alcohol) derivative is preferably used for the ink-receptive layer(s) (b). Poly(vinyl alcohol) or a derivative thereof can be the sole binder polymer in the step of coating the ink-receptive layer (b), i.e. no other polymer binder is present in the ink-receptive layer (b) apart from any optional polymeric particles as described below.

"Poly(vinyl alcohol)" is herein defined as generally acknowledged in the art as a completely or partially hydrolyzed poly(vinyl acetate). The degree of hydrolysis attributed to a poly(vinyl alcohol) designates the degree of hydrolysis of the poly(vinyl acetate) in accordance with standard practice. The degree of hydrolysis according to the invention is preferably from 78 to 99 mol %, more preferably from 80 to 98 mol %, even more preferably from 82 to 96 weight %, even more preferably from 84 to 93 mol %, and most preferably from 86 to 92.5 mol %. Depending on the inorganic particle used for preparing layer (b) the hydrolyzation degree as well as the molecular weight of poly (vinyl alcohol) has to be chosen in order to achieve a homogeneous coating, no coating artefacts as e.g. cracking, good cohesion of the coating and high porosity. Preferably, high molecular weight poly(vinyl alcohol) is used.

Poly(vinyl alcohol) derivatives most suitable for preparing the ink receptive layer (b) are such derivatives providing crosslinkable and/or reactive groups. With "derivative" is meant that the polymer comprises groups modifying the chemical basic structure of the polymer, e.g. pendant groups or co-polymerized monomers providing the polymer additional properties or characteristics.

Poly(vinyl alcohol) with silanol modification as e.g. Kuraray Poval™ 25-98 R are able to crosslink by itself after drying or crosslink with OH-groups of the particles used for the microporous coating, e.g. fumed silica.

Keto group containing modified poly(vinyl alcohol)s are particularly preferred as the binder, since the keto group can be crosslinked by means of a chemical crosslinker. Such poly(vinyl alcohol) derivatives or copolymers preferably comprise 0.5 to 5% of a side group bearing the keto function. These groups can be included by copolymerizing or achieved by polymer analogous modification of the poly (vinyl alcohol). An example of a monomer for copolymerization is diacetone acrylamide, e.g available from Japan VAM & Poval Co., Ltd. as Poval D series. Aceto acetyl modified poly(vinyl alcohol) is available e.g. Gohsefimer Z series of polyvinylalcohols from Nippon Gohsei.

Crosslinking of the reactive keto groups can be achieved by several substances having reactive groups like diamines, e.g. hexamethylenediamine or methaxylenediamine, glyoxylic acid, salts of glyoxylic acid, dialdehydes, e.g. glyoxal, di- or polyols, e.g methylolmelamine or urea formaldehyde resins or urea glyoxal resins. Furthermore, crosslinking can be achieved by polyvalent metal salts, e.g. zirkonates or titanates. Preferably, glyoxal, glyoxylic acid, salts of glyoxylic acid as sodium or calcium salts and adipic acid hydrazide is useful for crosslinking of the keto modified poly(vinyl alcohol).

The use of crosslinking poly(vinyl alcohol) (derivatives) improves the water fastness of the microporous ink jet coating to some extent but does not meet the requirements for decorative applications. Although the microporous coating stays water sensitive the use of crosslinked poly(vinyl alcohol) (derivative) in the present concept is preferred.

Mixtures of poly(vinyl alcohol) and/or its derivatives in the formulation can be advantageous, e.g. for optimizing water sensitivity, viscosity, solubility and coating process parameters.

The degree of hydrolysis of the poly(vinyl alcohol) (derivatives) has to be understood as an average value, meaning that mixtures of less hydrolyzed and more hydrolyzed poly(vinyl alcohol) types can be used as well.

Typically, the weight average molecular weight of the poly(vinyl alcohol) or one of its derivatives is at least 100.000 g/mol, more preferably at least 120.000 g/mol, and most preferably at least 150.000 g/mol, as determined by gel permeation chromatography using polystyrene standards combined with static light scattering (absolute method) on re-acetylized specimen. Re-acetylization is performed by standard methods known in the art, e.g. in a pyridine/acetic anhydride mixture. There is no typical maximum value of the weight average molecular weight; sometimes it is below 300.000 g/mol.

Accordingly, the preferred viscosity of a freshly produced 4 weight % aqueous solution of the poly(vinyl alcohol) (derivative) at 20° C. determined by a Höppler falling ball viscometer following DIN 53015 is from 15 to 150 mPa$\times^1$ s, more preferably from 25 to 80 mPa$\times^{II}$ s.

The ratio of the weight amounts of the inorganic particles to the binder is in the range of from 2:1 to 20:1, preferably 3:1 to 15:1, which may vary somehow in dependency of which type of particles and which type of binder(s) are used.

Boehmite particles and the binder poly(vinyl alcohol) preferably are present in the ink-receptive layer in a weight ratio of from 6.5:1 to 20:1, preferably from 7:1 to 15:1. Silica particles and the poly(vinyl alcohol) are present in the ink-receptive layer in a weight ratio of from 2:1 to 15:1, preferably from 3:1 to 10:1. A lower weight ratio might result in an ink-receptive layer having a too low porosity and thus low ink absorptivity, and a higher weight ratio might result in an instable ink-receptive layer which exhibits a low flex-crack resistance, insufficient adhesion to the polymer film or the intermediate primer coating and can cause cutter dust when cut.

Polymerizable and/or Crosslinkable Compounds having at Least One (meth)acrylate Moiety To the ink jet receptive layer (b) further polymerizable and/or crosslinkable monomeric or polymeric compounds having at least one (meth)acrylate moiety or a polymer which is crosslinked via (meth)acrylate moieties are added. With (meth)acrylate moiety is meant that the compound comprises an acrylate or a methacrylate moiety.

The compounds having at least one (meth)acrylate moietie(s) are polymerizable and/or crosslinkable due to the presence of reactive groups. At least one of said groups is (meth)acrylate, however, said compound can have further, different reactive groups resulting in polymerization of the monomers or building crosslinks.

According to the invention polymerization can be obtained by any known method, however, preferably is obtained by applying radiation to the compounds, more preferably in particular UV or electron beam radiation. Polymerization and/or crosslinking in the present application is also described here as "curing" the compounds. Accordingly, the polymerizable and/or crosslinkable compounds are also designated as being "curable" or "radiation curable".

The "polymer which is crosslinked via (meth)acrylate moieties" as defined herein is a polymer obtainable by said curing method(s) comprising as monomers, oligomers and pre-polymers the compounds defined herein as the "polymerizable and/or crosslinkable compounds". Thus, the polymer preferably is built from the compounds which have been included into the ink receptive layer, after coating said composition to the polymer film (a), preferably by applying the compounds into the layer (b). "Applying into the layer" preferably is obtained by applying a liquid comprising said compounds onto the microporous layer, which then are/ absorbed into the pores of said layer. Here the term "microporous layer" refers to the ink-receptive layer (b) not yet have included the polymerizable and/or crosslinkable monomeric or polymeric compounds having at least one (meth)acrylate moiety or a polymer which is crosslinked via (meth)acrylate moieties, i.e. the microporous ink receptive layer prepared by coating the coating composition comprising (at least) the pigment(s) and the binder onto the polymer film (a) and drying said layer, before the crosslinkable compounds are included by application to said layer.

Independent from the method used for including the curable compounds into layer (b), said layer should comprise at least 6 weight % of these compounds, based on the weight of the ink receptive layer, preferably the compounds should be present in a range of at least 10 weight % to 100 weight %, even more preferred from at least 15 weight % to a maximum of 70 weight % and most preferred in an amount of from 20 to 60 weight % based on the weight of the ink receptive layer.

Suitable (meth)acrylic monomers, oligomers and prepolymers are commercially available and can be categorized in acrylic and methacrylic moieties containing substances with low to medium molecular weight and be able to be polymerized by a radical polymerization mechanism. Particularly, substances with 2 or more (meth)acrylic groups are useful in order to achieve crosslinking.

Examples for substances useful for the radiation curing coating according to the present invention are:

Monomers and reactive diluents are defined in the context of the invention as low viscosity compounds with high boiling points, comprising one or more (meth)acrylic groups. These are e.g. compounds having a viscosity below 1000 mPa*s, preferably below 500 mPa*s, more preferred below 300 mPa*s, even more preferred below 200 mPa*s, and a boiling point above 150° C., preferred above 200° C. at ambient pressure. Preferred kinds of compounds are esters of (meth)acrylic acid with mono- or polyvalent alcohols which may be ethoxylated or propoxylated.

Oligomers and Prepolymers are defined as higher molecular weight, e.g. 1000 g/mol to 20.000 g/mol components compared to monomers and reactive diluents and have particularly a higher viscosity, typically in the range of at least 200 mPa*s, preferably at least 300 mPa*s, more preferred at least 500 mPa*s, even more preferred at least 1000 mPa*s to 20.000 mPa*s. Also, higher molecular weight polymers are suitable components of the radiation curing coating.

In the present application, if a viscosity is mentioned for a particular compound, it is meant that said viscosity refers to the liquid compound as such, measured as defined below in section "test methods". If the viscosity is mentioned for a formulation or a composition, said viscosity refers to the referenced composition, in particular to the ready prepared composition.

Examples of these kinds of compounds are offered e.g. by Allnex (Ebecryl®, Ucecoat®), BASF(Laromer®), Arkema (Sartomer®), Evonik (TEGO®rad), Covestro (Bayhydro®), DSM (AgiSyn™,NeoRad™), IGM (Photomer®) and other companies and comprise, e.g. monomers, reactive diluents, prepolymers and polymers like polyester acrylates, epoxy acrylates, urethane acrylates, amine modified acrylates, silicone acrylates, (meth)acrylated poly(meth)acrylates.

Examples for suitable compounds are isodecyl acrylate, cyclic trimethylolpropane formal acrylate, dihydrodicyclopentadienyl acrylate, 2-propylheptyl acrylate, 4-tert-butylcyclohexyl acrylate, ethyldiglycol acrylate, 2-(2-ethoxy-ethoxy)ethyl acrylate, phenoxyethyl acrylate, 1,6-hexanediol diacrylate (HDDA), dipropylene glycol diacrylate (DPGDA), tripropylene glycol diacrylate (TPGDA), propoxylated (2.0) neopentyl glycol diacrylate, trimethylolpropane triacrylate (TMPTA), propoxylated (3.8) glycerol (GPTA) triacrylate, ethoxylated (3.0)trimethylolpropane triacrylate, propoxylated (3.5)trimethylolpropane triacrylate, ethoxylated (5.0) pentaerythritol tetra acrylate (PPTTA); dipentaerythritol hexaacrylate, trimethylpropaneformal mono acrylate, 2-phenoxyethyl acrylate, 4-t-butylcyclohexyl acrylate, tripropylenglycol diacrylate, Tris(2-hydroxy ethyl) isocyanurate triacrylate, EBECRYL® 113 monofunctional epoxyacrylate, oxyethylated phenol acrylate, e.g. EBECRYL® 114 ethoxylated 2-phenoxyethyl acrylate, AgiSyn™ 2895 ethoxylated (4) nonylphenol acrylate, isobornyl acrylate (IBOA), octyl and decyl acrylate (ODA), tricyclodecanediol diacrylate, propoxylated neopentyl glycol diacrylate, bisphenol A derivative diacrylates, trimethylolpropane ethoxy triacrylate, Photomer® 4003 nonyl phenol [4.0] acrylate, Photomer® 3005 acrylated epoxy soy oil, Photomer® 3015 bisphenol A epoxy diacrylate, Photomer® 2006 trimethylpropane trimethacrylate (TMPTMA), Photomer® 2012 isobornyl methacrylate, Photomer® 2050 polyethylene glycol (200)di-methacrylate, Photomer® 2812 lauryl methacrylate, lauryl acrylate, Photomer® 4173 acid functional acrylate, Dipentaerythritol penta/hexaacrylate (DPHA), Laromer LR8863 ethoxylated trimethylol propane triacrylate, Further examples are EBECRYL® 4265 aliphatic urethane acrylate, EBECRYL® 5129 aliphatic urethane acrylate, EBECRYL® 8209 OH-functionalized aliphatic urethane acrylate, EBECRYL® 810 polyester acrylate, EBECRYL® 852 polyester acrylate, EBECRYL® 853 polyester acrylate, EBECRYL® 3105 epoxy acrylate, EBECRYL® 81 amine modified polyether acrylate, EBECRYL® 40 polyether tetraacrylate, EBECRYL® 50 polyether tetraacrylate, EBECRYL® 140 polyester acrylate, EBECRYL® 350 silicone diacrylate, EBECRYL® 1360 silicone hexaacrylate, Laromer® oligomers based on epoxy acrylates, e.g. LR8765R, LR 90263, LR8986, polyester acrylates, e.g. PE44 F, LR 8800, PE9105, Urethane acrylates, e.g. UA9072, LR8987, Polyether acrylates, e.g. Laromer® types P043F, LR8967, LR8982, LR8996, PO 77 F, PO 94 F, PO 9103, urethane (meth)acrylates and epoxy (meth)acrylates from Arkema, e.g. Sartomer® CN9002, CN966H90, CN9301, CN998B80, CN9210, CN92455, CN9303 and PR021252, aliphatic urethane acrylates from DSM, e.g. AgiSyn™ 230 A2, AgiSyn™ 230 A3, AgiSyn™ 230 T1, AgiSyn™ 242, AgiSyn™ 2421, AgiSyn™ 298, aromatic urethane acrylates from DSM, e.g. AgiSyn™ 670A2, AgiSyn™ 670T1, NeoRad™ U60, NeoRad™ U61, NeoRad™ U6288, polyester acrylates from DSM, e.g. AgiSyn™ 705, AgiSyn™ 707, AgiSyn™ 716, AgiSyn™ 720, epoxy acrylates from DSM, e.g. bisphenol A epoxy acrylate AgiSyn™ 1010, methacrylated acrylic polymers, e.g. NeoRad™ A-20, AgiSyn™ 9790, amine modified polyether acrylates from DSM, e.g. AgiSyn™ 701, AgiSyn™ 703, NeoRad™ P-85. Silicon acrylates from Evonik are offering specific wetting, slip, release and hydrophobic properties, when included into a radiation curable formulation. Examples for such substances are TEGO® Rad 2010, TEGO® Rad 2100, TEGO® Rad 2200, TEGO® Rad 2250, TEGO® Rad 2300, TEGO® Rad 2500, TEGO® Rad 2650, TEGO® Rad 2700, TEGO® Rad 2800.

Further, e.g. isocyanato acrylate with isocyanate and acrylic groups in one molecule, e.g. Laromer® LR9000 or Sartomer® Pro 21596 can be used for dual cure applications for combined thermal and radiation curing.

In particular if the compounds are applied to the dried microporous layer (b) to form the "ready-prepared" ink receptive layer (b), organic solvents can be used to dilute the radiation curing formulation before application to the ink receptive layer (b) in order to achieve a suitable viscosity and/or to improve wetting of the layer surface. The viscosity of the applied formulation preferably should be below 1000 mPa*s, preferably below 800 mPa*s, more preferred below 500 mPa*s, and most preferred below 200 mPa*s, however, is at least 10 mPa*s, preferably at least 20 mPa*s, more preferred at least 30, 50 or 100 mPa*s.

Instead of using organic solvents water-based radiation curing formulations are applicable to the microporous layer (b). It has been found that water-based radiation curable emulsions easily penetrate into the porous structure of the microporous layer (b) and after curing increase the mechanical properties of the coating. Examples for suitable UV-curing emulsions are UCECOAT® 7200 aliphatic urethane acrylate emulsion from Allnex; UCECOAT® 7210 aliphatic urethane acrylate emulsion and Laromer® WA9057 acrylated acrylic emulsion from BASF.

Furthermore, water-based radiation curing dispersions are able to be incorporated in the microporous coating or may penetrate into the microporous structure by overcoating the microporous layer as long as the particle diameter of the dispersion is below the pore dimension of the coating. Examples for such kind of UV curing dispersions are UCECOAT® 7849 aliphatic polyurethane acrylate dispersion from Allnex or Laromer urethane acrylate dispersions, e.g. UA 9064, UA9095, polyester acrylate dispersion, e.g. PE55 WN from BASF or Bayhydrol® UV types from Covestro like UV 2282, UV2317/1, UV 2280, UV XP 2687, UV 2689/2, UV 2720/1, UV XP 2775 and UV2877.

Also, water soluble radiation curing substances can be used in the above mentioned systems or as a sole ingredient. Examples for water soluble radiation curing substances are Laromer® 8765 R, Photomer® 2050 polyethylene glycol (200)di-methacrylate, polyethylene glycol (400)di-methacrylate, polyethylene glycol (600)di-methacrylate and Sartomer® CN92455, AgiSyn™ 2834 polyethyleneglycol (400)diacrylate, AgiSyn™ 2862, AgiSyn™ 2863, AgiSyn™ 2866.

In a particular embodiment of the present invention reactive isocyanate groups are incorporated into the radiation curing formulation by adding isocyanato (meth)acrylates or di- or polyisocyanates. The isocyanate groups present in the radiation curing coating are able to thermally react with OH-groups, particularly primary OH-group, by thermal curing. These OH-groups can be present in the radiation curing component and/or in components of the ink applied to the microporous coating, e.g. OH-group containing humectants as glycols, e.g. propylene glycol, (poly)ethylene glycols or glycerin, By means of this dual cure reaction with a radiation curing component an increased crosslinking can be achieved. In the case of reaction with an OH-group containing humectant these liquid components can be bound/included into the polymeric crosslinked structure which reduces or avoids the migration of these ink components in the coating as well as in the final application, e.g. in a rigid board or panel. As an example, urethane (meth)acrylates with isocyanato (NCO) functions like Sartomer® PR021596 can be used in the above mentioned systems.

In case of OH-group containing (meth)acrylate monomers, oligomers or pre-polymers it is possible to achieve further crosslinking, meaning additionally to the radiation curing crosslinking, by said isocyanates. Examples for polymers obtained by such monomers, oligomers or pre-polymers are OH-group containing polyurethane acrylates or OH-group containing acrylated poly(meth)acrylates which may react with di- or polyisocyanates, e.g. isophorone diisocyanate, hexanediol diisocyanate, polymeric isocyanates, preferably based on aliphatic precursors, e.a. as offered by Covestro (Desmodur®) and Mitsui Chemical (Takenate®). The thermal reaction of isocyanate groups with OH-groups, e.g. preferably primary OH-groups, to yield urethane groups takes place at elevated or ambient temperature and can be accomplished before or after the radiation curing of the acrylic moieties, preferably by facilitation of a suitable catalyst like dibutyl tin laurate (DBTL)

The reaction of isocyanates with the OH-group containing ink components, if present after the printing and optional drying, is preferred in order to reduce volatile and semi volatile. organic components. Isocyanato(meth)acrylates are used as part of the (meth)acrylates comprising radiation curing coating up to 20% by weight of the coating. Di- or polyisocyanates may be added to the radiation curing component as an additional ingredient in quantities of up to 30% by weight based on the radiation curing components. Preferably, isocyanate components should be used in a range of 0.3 to 2.0-fold of the stoichiometric ratio to the reactive OH-groups.

The (meth)acrylate moieties comprising compounds can either be already included into the "layer (b) composition" prepared to be coated onto the polymer film (a) for forming the ink receptive layer (b), or these (meth)acrylate moieties comprising compounds can be applied into the microporous layer (b) to form the ready-made ink receptive layer (b) by applying the compound(s) in form of a liquid able to quickly penetrate into the microporous structure of layer (b). In the latter case, said compound(s) can be applied undiluted, if said compound(s) itself represent(s) a liquid having a suitable viscosity, or the compound(s) can be provided as a solution, emulsion or dispersion onto the surface of layer (b), wherein the viscosity and consistence of the applied liquid should be adapted to allow the liquid to penetrate quickly into the porous structure of layer (b).

Application of the liquid containing the (meth)acrylate comprising compounds onto the dried microporous layer (b) can be carried out before or after printing of said layer (b), however, is preferably applied after printing. Further, a portion of the liquid containing the (meth)acrylate comprising compounds can be applied before printing layer (b), and a further portion can be applied after printing. In case the (meth)acrylate comprising compounds are included or applied into the layer (b) before printing, said compounds preferably are equally distributed throughout the whole scope of ink receptive layer (b). In case the compounds are applied into layer (b) after printing said layer (b), the compounds are only absorbed into the pores remaining after ink application, thus, may be not fully equally distributed within layer (b).

It should be clearly understood, that, if the compounds having the (meth)acrylate moieties are included to or applied into layer (b) before said layer is printed, the layer (b) after drying still comprises a microporous structure, which means that the compounds are applied in an amount and in a distribution not filling the whole scope of the entirety of the pores, leaving residual pore volume (porosity) as defined below, but rather more than 50%, preferably more than 55%, even more preferred not more than 60% and most preferred more than 70% of the initial pore volume/porosity present in the microporous layer (b) before application of the radiation curing compounds. Only in case the layer is already printed before the compounds are applied, it is preferred that the pores of layer (b) are filled at least 6%, preferably at least 10% or particularly preferred at least 20% of the initial porosity with the applied compound(s). If the compounds are applied after printing layer (b), it is further possible to apply so much of the compound liquid to the surface of layer (b) that all of the remaining pores are filled and further a layer of the polymerizable and/or crosslinkable compounds is formed on top of the surface. The porosity of the layer is determined by the method as defined below in section "test methods".

By applying a curing method, e.g. preferably radiation, to the polymerizable and/or crosslinkable compounds, said compounds polymerize and crosslink, thus, can form the polymer crosslinked via (meth)acrylate moieties. Application of the curing method suitably is carried out before or after printing the layer (b) with the desired image, pattern, picture or design.

Further Ingredients

The ink-receptive layer (b) of the present invention may comprise further particles in addition to the fine boehmite or silica particles, e.g. in order to adapt the coefficient of friction (CoF) or the gloss of the surface of the inkjet printable flexible film. Suitable particles preferably have a particle size ($d_{50}$, volume mean) of 1 to 25 μm, as determined by laser diffraction according to ISO 13320, and include silicas such as precipitated silicas, gel type silicas, alumina, boehmite, preferably gel type silicas, and polymeric particles such as dispersible particles comprising a polymer selected from polymers and copolymers of ethylene, propylene, styrene, tetrafluoroethylene, and (meth)acrylates, e.g. polymethylmethyacrylate and styrene/methylmethacrylate copolymer; polyamides; polyesters; and starch, such as rice or corn starch, and mixtures of the afore-mentioned particles. In preferred embodiments the further particles, including the above-mentioned silicas and polymeric particles, are spherical.

The optional particles which are different from boehmite or silica are comprised in the ink-receptive layer in a maximum amount of 20 weight %, based on the total dry coating weight of the ink-receptive layer, preferably the ink-receptive layer comprises >0 to 20 weight % of these optional particles. More specifically, the ink-receptive layer can comprise >0 to 12 weight % of silica as described above and/or >0 to 10 weight % of polymeric particles as described above, preferred >0 to 5 weight % of silica and/or >0 to 5 weight % of polymeric particles.

The ink-receptive layer is typically formed from an aqueous coating composition comprising boehmite or fumed silica particles and poly(vinyl alcohol), an dispersing agent and boric acid and/or a borate.

For boehmite particles acidic dispersing agents with $pk_a$ value of less than 5.0, preferably less than 4.9, more preferably less than 4.0, even more preferably less than 3.0, and most preferably less than 2.0 are used. Suitable acidic dispersing agents include strong organic acids having a $pk_a$ of less than 5.0, such as formic acid ($pk_a$=3.77), acetic acid ($pk_a$=4.75), lactic acid ($pk_a$=3.90), and propionic acid ($pk_a$=4.87), and inorganic acids having a $pk_a$ of less than 5.0. In preferred embodiments the acidic dispersing agent comprises an inorganic acid having a $pk_a$ of less than 2.0, such as HCl, HBr, $HNO_3$, $H_2SO_4$, and sulfamic acid.

Preferably, the acidic dispersing agent, especially the preferred acidic dispersing agents mentioned above, is present in the aqueous coating composition in a maximum amount of 10 weight %, based on the weight of the boehmite particles. Typical amounts of the acidic dispersing agent range from 1 to 5 weight %, based on the weight of the boehmite particles.

In case of non-surface modified fumed silica particles, prior to a fine dispersion of these anionic particles a cationic modification of the surface has to be achieved by cationic polymers, cationic oligomers, amino silanes or inorganic multivalent cations like aluminum or titanium salts. Examples for cationic polymers with cationic charge are like poly amino(meth)acrylates and copolymers, PDADMAC and copolymers, cationic modified Polystyrenes, cationic Polyurethanes. Inorganic modification of the silica surface can be also be achieved. These substances and their mixtures can be used for dispersion of the fine silica particle in order to achieve a dispersion of small primary aggregates of silica particles typically have a particle size ($d_{50}$, volume mean) in the range of from 30 nm to 300 nm, preferably from 50 nm to 200 nm, more preferably from 80 to 180 nm. When using such kind of silica dispersion for microporous ink jet coatings the desired high pore volume can be achieved after drying due to the aggregation of the fine particles.

In preferred embodiments the ink-receptive layer (b) based on silica comprises cationic aluminium salts, e.g. polyaluminiumchlorid, polyaluminiumoxychlorid, cationic silanes or their corresponding hydrolysates, e.g. 3-aminopropyl trimethoxysilane, N-2-aminoethyl-3-aminopropyl trimethoxysilane, n-butyl aminopropyl trimethoxysilane, aminopropyl triethoxysilane, N-2-aminoethyl-3-aminopropyl triethoxysilane, n-butyl aminopropyl triethoxysilane, poly(dimethyldiallylammonium chloride) (polyDADMAC) and/or cationic poly(meth)acrylates in order to render the silica pigments dispersible.

The boric acid and/or borate present in either the aqueous coating composition itself (method (i) or in an underlying layer (method (ii)) function as a crosslinking agent for the poly(vinyl alcohol) binder although the actual crosslinking mechanism is not fully understood. Following the rules of chemical equilibrium, it depends on the pH value of the aqueous coating composition whether the protonated form or the deprotonated forms (borates) of boric acid is/are the dominant species. The boric acid can be added as boric acid, boron oxid (reacting with water to boric acid) or borate such as sodium tetraborate decahydrate and potassium tetraborate decahydrate. Boric acid and/or borates are typically used in the aqueous coating composition in a total amount of from >0 to 20 weight %, preferably from 1 to 15 weight %, and more preferably from 3 to 12 weight %, each calculated as $H_3BO_3$ and based on the amount of poly(vinyl alcohol).

The boric acid crosslinking agent improves the drying properties of the ink-receptive layer, e.g. avoids crack formation in the coating during the drying process. If high amounts of boric acid/borate are used strong crosslinking of the poly(vinyl alcohol) results which might lead to a brittle coating at high coating weights. As the crosslinking is reversible under humid or wet conditions the coating without any other strong binding mechanism is sensitive to water and does not fulfil the task of the invention. Other crosslinking agents may be added to the composition or replace the boron containing component. This includes reactive crosslinking agents like glyoxal, melamine formaldehyde resins, urea formaldehyde resins, di- and poly-isocyanates, epoxy crosslinkers, aziridine crosslinkers, without being restricted to the mentioned.

In a preferred embodiment keto group containing poly (vinyl alcohol) is used as the binder for the inorganic particles. In this case a preferred crosslinking agent is any hydrazide, in particular adipic acid di-hydrazide, or glyoxylic acid and its salts.

Further optional components apart from the acidic dispersing agent and crosslinking agent may be present in the aqueous coating composition and thus, in the ink-receptive layer(s) (b). These optional components include compounds such as wetting agents, antifoaming agents, surfactants, biocides, plasticizing agents, hydrophobic modification agents, stabilizers, silanes, colorants, fixing agents, antistatic agents, dyes, UV absorbers and optical brighteners. Typically, the ink-receptive layer preferably comprises less than 10 weight %, preferably less than 5 weight %, more preferably less than 3 weight %, based on the total weight of the ink-receptive layer of such optional compounds.

In order to improve the fixation of the inks by precipitation of the ink pigments cationic components may be added to the ink receptive layer, e.g. water soluble multivalent metal salts such as calcium, manganese, aluminum or titanium salt or cationic polymers such as polyalkylene polyamines, acrylic polymers comprising a secondary, tertiary or quaternary amino group, a diallylamine polymer, e.g. diallyldimethylammonium chloride polymer, polyvinylamine, polyvinylamidine, dimethylamine-epichlorohydrin polymer and the like, as well as copolymers thereof.

In order to prepare the aqueous coating composition for forming the ink-receptive layer (b) the components are typically mixed by conventional lacquer manufacturing means. Preferably, the pre-dispersed inorganic particles and any optional further particles are dispersed in cold or hot water by means of strong agitation or high shear mixing devices, e.g. with rotor-stator principle, in the presence of the dispersing agent. This leads to a dispersion with the required particle size for a homogeneous coating. Typically, the binder, e.g. poly(vinyl alcohol) (derivative) is separately dissolved in water and heated for full dissolution to temperatures of from 70° C. to 100° C. The particle dispersion and the binder solution are mixed together in order to obtain an aqueous coating composition. Boric acid/boron oxide/borates and any other optional ingredients can be added at any stage of the preparation process. Boric acid/boron oxide/borates are added preferably shortly before applying the aqueous coating composition to the substrate (method (A)). Alternatively, or additionally, boric acid/boron oxide/borates can also be applied to the substrate film before application of the aqueous coating composition (method (B)). Application of the coating composition to the film might preferably comprise the addition of the boric acid/boron oxide/borates to an intermediate layer (c) specified below (e.g. as described in EP 1 861 258 B1).

Typically, the aqueous coating composition has a solid content of from 10 to 40 weight %, preferably from 15 to 30 weight %. A typical pH value is within the range of from 2 to 6, preferably from 3 to 5.

The aqueous coating composition can be coated onto the substrate, i.e. the polymer film (a) or any optional intermediate layers, by any conventional coating method known in the art. For example, the aqueous coating composition can be applied by means of a curtain coater, a die coater, a roll coater, an air knife coater, a blade coater, a rod coater, a bar coater, or a comma coater. Application by a curtain coater, such as a curtain coater having one or multiple dies, is preferred.

The ink-receptive layer (b) can be coated onto the substrate in form of more than one partial ink-receptive layers, i.e. in partial ink-receptive layers having varying compositions. In this case two or more partial ink-receptive layers together form the ink-receptive layer (b) as defined in the claims. For example, the adaption (variation) of the ratio of the inorganic particles, e.g. boehmite or fumed silica particles to the polymeric binder in the individual partial layers allows the graduation of properties such as absorptivity and fixing ability. For example, high ink absorption in the first partial coating layer close to the polymer film (a) can be combined with strong fixation of the pigments of the ink in the outer partial layer of ink receptive layer (b). Optimization by using such a multilayer coating technology comprises also to apply different partial layers or even different layers (b) in form of coatings with different properties, like different pore sizes, different cationic surfaces, e.g. combining boehmite coatings with silica coatings, or other desired properties.

The dry coating weight of one ink-receptive layer (b) is in the range of from 5 to 30 g/m², preferably from 8 to less than 28 g/m², even more preferred from 10 to 25 g/m². The actual dry coating weight can be adapted to the intended use of the inkjet printable flexible film, for example to the type of printer employed to print the inkjet printable flexible film. The ink receptivity and the drying time can be controlled by selecting an appropriate dry coating weight.

Typically, the ink-receptive layer (b) is a microporous layer, i.e. a layer having an average pore diameter of less than 0.5 µm, preferably less than 0.2 µm as determined by gas adsorption according to DIN 66135-1 on a peeled off and pulverized layer after drying at 130° C. for 1 h. Preferably the pore diameter is in the range of from 2 nm to less than 0.5 µm, more preferred from 5 nm to less than 0.2 µm, even more preferred in the range from 10 nm to 100 nm. In preferred embodiments the ink-receptive layer has a pore volume (porosity) being in the range of from 0.3 ml/g to 1.5 ml/g, preferably of from 0.4 to 1.0 ml/g.

The ink-receptive layer (b) can be the sole ink-receptive layer present in the flexible film of the present invention. However, in some embodiments the flexible film can comprise at least one additional ink-receptive layer different from the ink-receptive layer (b), preferably applied on top of the ink-receptive layer (b). The additional ink-receptive layer is referred to as ink-receptive top layer (f) in the following. Said further ink receptive layer (f) preferably is a thin layer, i.e. has a thickness in the range of from 20 to 500 nm.

The ink-receptive top layer (f) can be applied, for example, in order to increase the dot size and/or to reduce the sliding resistance. Preferably, the ink-receptive top layer (f) comprises particles as defined above as "further particles" for the ink-receptive layer (b) in addition to the inorganic particles, e.g. boehmite particles. Preferably, the further particles have a particle size ($d_{50}$, volume mean) of 20 to 100 nm, as determined by laser diffraction according to ISO 13320, e.g. comprising a colloidal silica as Cartacoat® K 303 C from Archroma.

The surface of the ink-receptive layer (b) or the ink-receptive top layer (f), if present, can have a matte, semi-matte, or glossy appearance having gloss values varying from 1 to 90 GU (gloss units), typically from 20 to 80 GU as determined at a measuring angle of 60° according to ISO 2813. Preferably, the ink-receptive layer has a glossy appearance such as silk gloss (about 10 to 40 GU) or high gloss (about 40 to 80 GU). The gloss value can be adapted by adding coarser particles as described above or by using matt films or pre-coatings.

The polymer film (a) and the ink-receptive layer (b) are either in direct contact with each other or one or more intermediate layers (c) are present between the biaxially oriented polymer film (a) and the ink-receptive layer (b). Preferably, the ink-receptive layer is not in direct contact with the polymer film (a), if said polymer film comprises a layer or is consisting of a homopolymer of polypropylene. The intermediate layer (c) can have various effects, for example, it can function as an adhesion promoting layer (primer layer).

An adhesion promoting layer (c) improves the wettability of the polymer film (a) and its adhesion to the adjacent ink-receptive layer (b) and thus results in an increase of composite strength. Preferably, PP and PET based films are selected for the decor laminate. The films are typically coated with an adhesion promoting layer (c) before the ink-receptive layer (b) is formed thereon. Exemplary materials for the adhesion promoting layer, including for application on PP and PET films, are acrylic polymers, such as poly(meth)acrylates and copolymers comprising (meth)acrylates, poly(vinyl acetate)s, and polyurethanes, as well as copolymers and blends of these polymers. Optionally, the adhesion promoting layer may contain boric acid and/or borates such as sodium tetraborate decahydrate and potassium tetraborate decahydrate. The thickness of the adhesion promoting layer can vary from about 10 nm to 10 µm. Preferably biaxially oriented polymer films, especially BOPP and BOPET films, already coated with an adhesion promoting layer are commercially available, e.g. Melinex 347 from DuPont. In these cases, the thickness of the adhesion promoting layer is generally less than 1 μm, typically from 10 to 200 nm. Commercially available polymer films already coated with an adhesion promoting layer are often coated on both surfaces meaning that an additional adhesion promoting layer can also be present on the surface of the biaxially oriented polymer film (a) far from the ink-receptive layer (b) as a lower layer. This layer is able to improve the adhesion of the final decorative laminate, e.g. the adhesion of the inventive decor printed film to any board or panel resulting in the final product. Commercially available polymer films already coated with an adhesion promoting layer can also be coated with one or more further adhesion promoting layer(s) on either or both sides.

It is understood that the polymeric film and/or the adhesion promoting layer (c) can be subjected to pretreatment, e.g. a corona or flame pretreatment to further improve adhesion to the ink-receptive layer (b).

Typically, a white opaque polymer film is used as the substrate in order to achieve a high contrast image. The opacity of the flexible film, in particular the opacity of the inkjet printed flexible film is preferably at least 50%, more preferably at least 60%, even more preferably at least 70%, and most preferably at least 75%, as determined according to ISO 2471. The brightness (lightness) L* of the printable surface of a white opaque inkjet printable flexible film is preferably at least 88, more preferably at least 90, as determined according to ISO 13655.

Alternatively, the polymer film (a) is lightly or strongly colored in order to obtain a background for printing. This may ensure a very homogeneous base color for the final decorative board, save ink jet ink and may result in special color effects as needed or desired, e.g. for wood designs.

When a transparent polymer film is used as the substrate, the inventive flexible film, even if printed, can be transparent or translucent so that after lamination to any substrate, e.g. a board, the color of the substrate is shining through the transparent printed film. Transparency within the meaning of the present invention denotes a haze of less than 30%, more preferably less than 15%, and most preferably less than 10%, as determined according to ASTM D1003.

The inventive ink-receptive layer (b) ensures a high printing quality when subjected to inkjet printing. It quickly absorbs the applied ink and fixes the ink pigments on top of the microporous ink receptive coating. Ink-liquid penetration rates into the microporous coating of up to 10 ml/m$^2$s or up to 20 ml/m$^2$s can be reached. Thus, the present inkjet printable flexible film is suitable for high speed inkjet printing providing instant drying of the ink and operating with printing speeds from 15 to 300 m/min, typically from 30 or 60 to 300 m/min, such as high speed digital inkjet printing, e.g. high speed single pass inkjet printing. A high printing quality means high image resolution by defined round ink dots without any print artifacts such as bleeding, blurring, coalescence and mottling, a high color gamut, color saturation, and color brilliance. The inkjet printing quality as well as color gamut achieved for the present inkjet printed flexible film with suitable inks often exceeds that of conventional intaglio (gravure) printing.

Any aqueous (water-based) inkjet ink can be used for printing on the ink-receptive layer (b) of inventive inkjet printable flexible film. Suitable aqueous inks include both dye-based inks comprising water-soluble dyes and/or dye clusters and pigment-based comprising dispersed pigment, wherein pigment-based inks being preferred. Depending on the intended use of the inkjet printable or printed flexible film the aqueous ink is preferably dedicated to decor printing, e.g. using colorants for CMYK printing or CRYK printing. The inks may contain substances as surfactants, dispersing agents, humectants, binders, biocides, defoamers, polymers and the like.

Suitably, a four ink CMYK (cyan, magenta, yellow, and black) or a CRYK (cyan, red, yellow, and black) system can be used for printing on the ink-receptive layer (b) of the inkjet printable flexible film. However, special colors, e.g. blue, green, orange, red and particularly white or silver, may be used as well. Typical pigment preparations are e.g. offered by Clariant under the Hostajet® PT brand, e.g. Hostajet® Yellow 4G-PT (PIGMENT YELLOW 155), Hostajet® Red D3G-PT VP 5121 (PIGMENT RED 254), Hostajet® Magenta E5B-PT (PIGMENT VIOLET 19), Hostajet® Magenta E-PT (PIGMENT RED 122), Hostajet® Cyan BG-PT (PIGMENT BLUE 15:3), Hostajet® Green 8G-PT VP 5154 (PIGMENT GREEN 36), Hostajet® Black O-PT (PIGMENT BLACK 7).

Preferably, aqueous pigment-based inks comprising low amounts of polymeric dispersing agents and polymeric binders are useful, as the colorants and the polymeric substances tend to coagulate on the surface of the microporous layer (b) shortly after printing before drying of the water and tentative humectants without closing the pores of the microporous coating completely. If the total amount of these compounds is less than 200 weight %, preferably less than 100 weight % based on the total weight of the ink pigment, the overprinting with further ink jet inks as well as filling of the porous structure by radiation curing substances after printing is possible. If the polymer content is higher, the inks may close the porous structure of the microporous coating and the application of further inks may result in coalescence issues and the application of radiation curing substances into the porous structure is hindered.

The ink may contain humectants, which are defined as water soluble volatile high boiling or very high boiling organic components. "Water-soluble" means for the water-soluble organic component that an organic component is soluble in water in an amount of 20 percent by mass or greater, such as polyols, e.g. ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, pentanediols, hexanediols, glycerin, 1,2,6-hexanetriol, 2-ethyl-1,3-hexanediol, ethyl-1,2,4-butanetriol, 1,2,3-butanediol, 2,2,4-trimethyl-1,3-pentanediol, polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, propylene glycol monoethylethe,; polyol arylethers, 2-pyrolidone, N-methyl-2-pyrolidone, N-hydroxyethyl-2-pyrolidone, 1,3-dimethyl-2-imidazolidinone, and E-caprolactam, N-methylformamide, N,N-dimethylformamide, 3-methoxy-N,N-dimethyl propionamide, monoethanolamine, diethanolamine, triethylamine, dimethyl sulfoxide, sulfolane, propylene carbonate, ethylene carbonate. These can be used alone or in combination.

The concentration of humectant in the ink typically is between 1% and 50% by weight based on the ink formulation, preferably in the range of 10% to 25%.

For the purpose of the invention it is preferred to use medium boiling components with a boiling point of 100 to 250° C. in lower concentrations which can be partly or fully removed during a drying step after printing, e.g. 1,2-propylene glycol in concentration of 20% by weight.

The image (pattern, design, picture . . . ) is printed by applying ink on the ink-receptive layer (b) of the inventive flexible film.

The ink receptive layer (b) can be located on the surface of the polymer film (a), which is on the side not attached to a substrate for lamination, e.g. far from a board to be laminated by the inkjet printed flexible film. If a transparent or translucent film is used, white ink for the back color can be applied by conventional printing technique such as flexo or offset printing on the surface of the film far from the ink-receptive layer (b).

Advantageously, the inventive inkjet printable flexible film is printed with a digital inkjet printer running with high printing speed such a printing speeds from 30 to 300 m/min, preferably comprising a single pass printing system, i.e. a printing system comprising a stationary printing bar over the web width which bar comprises the printing heads. Exemplary high speed single pass inkjet digital presses for aqueous inks are commercially available from Hewlett Packard (PageWide Industrial Presses), Kodak (Prosper®, Versamark®, Canon (Océ VarioPrint), KBA)(RotaJet®), Palis (Padaluma Printing), AstroNova/Trojan, Afinia, and Rigoli. High speed single pass inkjet printers are typically operated with piezo printing heads, for example available from Fujifilm Dimatix (e.g. SAMBA® printing head), Kyocera, Ricoh, and Xaar, with continuous ink jet print heads, e.g. from Kodak, or with printing heads and printing bars, respectively, available from Memjet or Canon.

Commercial printing machines which are capable of fast single pass ink jet printing with aqueous pigmented inks have been commercialized in the past years, e.g. RotaJet 168 or 225 from KBA with a print width of up to 2250 mm or printing machines from PALIS (Padaluma Printing) with a print width of up to 2250 mm. Specialty aqueous ink for decor printing is available from e.g. Arcolor and typically has a color set of Cyan, Red, Yellow and Black ink (CRYK). The amount of ink applied for 4 color printing typically ranges typically between 10 ml/m$^2$ and 20 ml/m$^2$, which is the reason why the microporous coating on a non-absorbing film has to provide sufficient ink uptake capability.

Methods for Applying the Polymerizable and/or Crosslinkable Compounds into the (Optionally Printed) Microporous Layer (b)

As an alternative to including the polymerizable and/or crosslinkable compounds having at least one (meth)acrylate moiety into the coating composition of the ink receptive layer (b) during preparation or the coating composition or during the coating process, said polymerizable and/or crosslinkable compounds can be applied to the ink receptive layer after its preparation, before and/or after printing said layer (b) with ink. Particularly preferred the polymerizable and/or crosslinkable compounds are applied to the ink receptive layer after its preparation, and at least a portion thereof after printing said layer (b). Mostly preferred the polymerizable and/or crosslinkable compounds are applied to the ink receptive layer after printing said layer (b).

In case the polymerizable and/or crosslinkable compounds are applied into the ink receptive layer (b) after printing and optional drying of the volatile ink components, the remaining space of the pores of the microporous coating are partially (at least 6%) or totally filled by the compounds which are able to undergo polymerisation and/or crosslinking by radiation curing as mentioned above. These compounds even are able to penetrate through the printed image and through unprinted parts of the image (white or colored background). Surprisingly, it was found that imaged areas with pigmented inks which have a sufficient low binder content can be penetrated by low molecular and low viscosity radiation curable compounds in order to—after curing—improve the mechanical properties of the printed microporous coating, increase the water resistance of the printed microporous structure and act as an additional binding agent for the pigmented inks. All these effects can be achieved at once by including the polymerizable and/or crosslinkable compounds into layer (b), e.g. with a single or multiple coating process on top of layer (b), even on top of the printed layer (b) to obtain the inventive flexible film suitable for decor applications.

For the purpose of overcoating and filling-up the porous structure several radiation curing systems are suitable.

The polymerizable or crosslinkable compounds, preferably radiation curable compounds can be applied as a 100% system (thus as an undiluted liquid) without any volatile components, or as a solution, dilution or emulsion. In these systems typically monomers, oligomers or prepolymers with one or more (meth)acrylic moiety are provided to the surface of layer (b) of the optionally already decor printed flexible film by an applicator system and are absorbed into the microporous structure by capillary forces. Suitably, the viscosity of this radiation curable liquid should be low, e.g. lower than 1000 mPa*s, preferably lower than 500 mPa*s, more preferred lower than 200 mPa*s, so that the time for penetration into the porous structure is matched to the radiation curing process step. This means, that in a typical inline process of application and radiation curing the formulation should be able to penetrate into the microporous coating between application and radiation curing step. In a high speed coating machine the time for penetration is limited, e.g. to a few seconds or even less than 1 second. It is important that at least a part of the radiation curing compounds are penetrating into the depth of the microporous layer (b) in order to ensure the inventive effects.

Therefore, according to the invention at least so much of the compounds have to penetrate into the layer (b) that said layer (b) comprises at least 6 weight % of its weight of the radiation curable compounds. By the formulation of mixtures of the radiation curable compounds the penetration properties can be adapted to the application and curing process. The viscosity of the application liquid should be carefully considered and adapted for this operation. Said viscosity can be modified by controlling the kind and the molecular weight of the substances used for the formulation as well as the temperature during application. Lower molecular weights for the compounds as well as higher temperatures, e.g. 40° C. to 70° C. are preferred.

Nevertheless, the radiation curable compounds may penetrate only partially, e.g. only up to the half of the thickness of layer (b) or even only up to 40% or 30% of the thickness of layer (b) into the microporous structure in order to obtain the inventive (optionally printed) flexible film. If also a part of the liquid comprising the curable compounds remains on top of the printed microporous layer (b) it is acting as top coating after curing. By this it is able to protect the printed and unprinted areas like an overprint varnish. But, for the present invention it is clearly necessary that at least a part of the curable compounds are penetrating into the microporous layer (b). It is preferred that the radiation crosslinked acrylic polymer is distributed over the whole cross section of ready-made and optionally printed layer (b) meaning that the polymer crosslinked via (meth)acrylic moieties is also present at the side of the microporous coating facing to the base film or to an intermediate layer, respectively.

Formulation of the Polymerizable and/or Crosslinkable Compounds

The above-mentioned radiation curable compounds are typically provided in form of a composition formulated for achieving the desired properties of the inventive product. Therefore, the desired radiation curable monomers, oligomers and prepolymers can either be included into the composition prepared for forming the ink receptive layer (b), or they can be used in liquid form, for application into said layer (b) after its coating. The last mentioned option is preferred.

In case the radiation curable compounds are included into the coating composition before layer (b) is coated onto polymer film (a), said compounds can be included either in form of solid particles, e.g. as a powder or a dispersion, or in form of a liquid, e.g. if the compound(s) are liquid themselves at room temperature, or as a solution, dilution, emulsion etc.

In case the radiation curable compounds are applied after preparation of layer (b), the desired compounds are provided in form of a liquid, optionally mixed with further ingredients for providing the final formulation which is then applied to the microporous layer (b) of the flexible film. The components of the liquid composition in particular are selected and combined in view to optimize the properties of the coating, e.g. according to fast or slow curing, soft or hard cured polymer, low to medium molecular weight, low or higher viscosity.

For application and fast and/or deep penetration of the liquid formulation one feature which has to be considered is the viscosity. It has been found that too high viscosity may lead to coating issues as low penetration or slow air release from the porous structure. Therefore, it is preferred to adjust the viscosity to lower than 1000 mPa*s, more preferred lower than 800 mPa*s, even more preferred lower than 500 mPa*s and it is most preferred to apply formulations with a viscosity lower than 300 mPa*s. In order to achieve said low viscosity solvents or reactive diluents can be added to the liquid formulation.

In the case of radiation curing formulation is provided without solvents (e.g. the curable compounds themselves are liquid), the viscosity can be controlled by addition of reactive diluents. These diluents like HDDA or TMPTA lower the viscosity of the formulation even when adding small amounts up to 30% by weight.

In case of organic solvents as diluents, suitable solvents and solvent mixtures are able to dissolve the monomers, oligomers and/or prepolymers of the radiation curable compounds, the formulation composition typically is obtained as a clear solution. Solvents having good solvating properties for the radiation curing components are preferred. These preferably include alcohols, ethers, esters, ketones and aromatic solvents, e.g. ethanol, propanol, butanol, isobutanol, methoxypropyl acetate, ethyl acetate, methyl acetate, acetone, methyl ethyl ketone, methyl isobutyl ketone, toluene, xylene and mixtures thereof, without being limited to these. Also, strong solvents like dimethyl sulfone, dimethyl acetamide, diacetone alcohol etc. can be used. Mixtures, e.g. of high boiling and low boiling solvents, are preferred. Particularly, solvents with a boiling point being in the range of about 60 to 250° C. are suitable for dissolving the ingredients of the formulation composition of the present invention, such as ethanol, isopropanol, n-propanol, butanol, diethyl ether, propylene glycol monomethyl ether, acetone, methyl ethyl ketone, methyl isobutyl ketone, ethyl acetate, butyl acetate, toluene and mixtures thereof, without being limited to these.

In case of water born systems solutions, emulsions and dispersions of radiation curable compounds can be diluted by water and/or organic water miscible solvents in order to lower the viscosity of the formulation.

According to the disclosure in a particularly preferred embodiment inorganic particles exceeding a diameter of 20 nm, preferably 10 nm, more preferred 5 nm, like e.g. pigments, are principally excluded from the formulation. This is due to the fact that such particles do not penetrate into the microporous coating easily and thus they will stay at the surface and/or are clogging the fine pores. On the other hand, small amounts of particles with diameters more than 300 nm, particularly more than 1 μm may be used for matting the final surface of the printed flexible film or in order to improve the scratch resistance if an excess of radiation curing components is staying on top of the microporous surface in order to bind such pigments. By using such particles, it should be considered that the penetration of the radiation curable substances should not be hindered substantially in penetrating into the depth of the microporous structure of layer (b).

The above mentioned radiation curing compounds can be formulated as a mixture of different compounds as well as with further non-solvent components e.g. to improve the coating quality or to improve the application properties. Further suitable components include surface active agents, defoaming agents, deaerator agents, viscosity modifiers, colored dyes or pigments, optical brighteners, anti-slip agents, slip agents, fungicides, bactericides, hydrophobic modifiers, e.g. silicones, without being limited to the mentioned. These substances are typically added in small quantities up to 5% by weight based on the amount of the radiation curing compounds.

Application

The formulation composition comprising the radiation curing compounds can be applied onto the microporous layer (b) of the unprinted or of the printed flexible film by means of standard coating equipment as known in the art, e.g by coating heads featuring a Mayer rod, an air knife, roll coating, knife-over-roll coating, reverse roll coating, gravure printing, reverse gravure printing, die coating, bead coating, slide coating or curtain coating, without being limited to these. After the formulation composition has been applied, the optional solvent is evaporated, preferably using hot air dryers, more preferably with forced air drying, e.g. impingement drying or infrared radiation supported drying. In case the formulation consists solely of 100% UV curing compounds the drying step can be omitted.

The application of the formulation can be run at low speed, e.g. at 3 m/min and up to high speed, e.g. 300 m/min. In order to obtain good and deep penetration of the coating through the unprinted and/or printed areas into the depth of a given microporous structure, the properties of the formulation can be adapted, particularly by optimizing the viscosity and the surface tension for the production process. In particular, the time between application operation and curing preferably should be taken into account. Applying the formulation by high speed processes lower viscosity is helpful for deep penetration as well as effective degassing. In case of any solvent or water has to be evaporated drying sections preferably are used to dry off these substances before radiation curing takes place. Furthermore, the process parameters might be adapted on the coat weight, the porosity and the wetting behavior of the microporous ink jet receptive layer (b) as well as on the ink amount applied. Both the structure, pore size, pore size distribution and porosity of the printed and unprinted areas are determining the uptake of the formulation of the radiation curing compounds.

For manufacturing the inventive flexible film the following method is suitable comprising the steps:
- (i) coating a polymer film having a thickness in the range of from 30 to 500 µm with a mixture comprising inorganic particles and a binder to provide at least one ink jet receptive layer(s) on the polymer film
- (ii) including or applying polymerizable and/or crosslinkable compounds having at least one (meth)acrylate moiety into the ink receptive layer.

It should be clearly understood that the inclusion of the polymerizable and/or crosslinkable compounds described above in step (ii) can be carried out as well during the preparation of the mixture of inorganic particles and binder coated in step (i) onto the polymer film. In this case preferably no additional amount of these compounds is further applied after the coating step (i) to the ink receptive layer, even if possible. However, it is clearly preferred to include the polymerizable and/or crosslinkable compounds described above by applying them to the ink receptive layer and include them by absorption. Before step (ii) the flexible film preferably is printed, particularly preferred with a pigment-comprising ink jet ink.

The disclosed method results in a flexible, (inkjet printable) film as described above in detail. After steps (i) and (ii) the prepared ink receptive layer comprises the polymerizable and/or crosslinkable compounds, however not yet a crosslinked polymer.

To provide the inventive flexible film with the desired properties concerning mechanic resistance and/or water resistance the ink receptive layer before or after printing is exposed to radiation to form a crosslinked polymer inside of the ink receptive layer. Thus, to obtain the final inventive flexible film, the method further comprises the step
- (iii) polymerizing and/or crosslinking the (meth)acrylated compounds contained in or applied to the ink receptive layer by applying radiation energy to obtain a polymer crosslinked via (meth)acrylate moieties.

which preferably is carried out after printing the ink receptive layer.

Accordingly, the method preferably comprises a further step (iv), which is
- (iv) applying an aqueous ink to the ink receptive layer.

Applying the aqueous ink comprising pigments is carried out to provide a desired print on the flexible film. Preferably application of the ink is done by ink jet printing. As mentioned above, said printing step (iv) can be carried out after step (i), before step (ii) or after step (ii) before step (iii), or after step (iii) to result in a printed flexible film according to the invention. It is preferred that step (iv) is carried out before step (iii), or even before step (ii) if the application of the radiation curable compounds is carried out after the ink receptive layer is prepared.

During step (ii), if the radiation curable compounds are applied after the ink receptive layer is prepared, the coating weight of the formulation composition comprising the radiation curing compounds is affecting the final properties of the inventive flexible decor film. In order to achieve high peel strength in wet and dry state of the final decor film it is advantageous to apply the formulation of the radiation curing compounds with a coating weight of at least 6% by weight (referenced to pure curing compounds without any solvent), preferably more than 10% by weight, even more preferred more than 20% by weight based on the weight of the microporous ink receptive layer. This ensures that the mechanical strength of the whole decor film is increased and reaches a level of at least 20 N/25 mm, preferably more than 30 N/25 mm in dry and wet state. The pores of the microporous ink receptive layer may be filled only partially or fully by the formulation comprising the radiation curing compounds (indeed the formulation can be applied in an amount so that an excess is coating the ink receptive layer), and it is most preferred that the formulation penetrates deep into the ink receptive layer up to close to the film side of said microporous layer.

The penetration depth can be analyzed by ablation of the printed coatings step by step, e.g. by laser ablation and analysis of the ablated substances by mass spectrometry with correlation to the depth of ablation. Alternatively, a cross section of the inventive printed flexible film can be analyzed by FTIR-ATR or Raman microscopy (Bruker) or by SEM (scanning electron microscopy in order to identify the radiation cured substance by typical absorption bands, e.g. carbonyl band in IR or Raman microscopy or by contrast differences in different depths of the printed microporous coating when using SEM.

The coating weight of the formulation comprising the radiation curing compounds is not limited by the (optionally remaining) porosity of the ink receptive layer, so that excess weight of the formulation may sit on top of the microporous layer enclosing the ink particles at the surface. This excess coat weight is easily cured together with the penetrated formulation.

In case that the formulation comprising the radiation curing compounds is applied before printing (step (ii) is conducted before step (iv)) it is preferred that the porous structure is not fully filled up by the radiation curing compounds so that water based ink jet ink may be taken up into the remaining pores. In this case it is clearly preferred to apply a coating weight of the radiation curing formulation of more than 6% by weight, preferred more than 10% by weight based on the microporous coating, preferable more than 15% by weight but not more than 60% by weight, preferably less than 50% by weight.

In order to at least partially fill the porous structure of the microporous ink receptive layer, it is preferred to dilute the formulation comprising the radiation curable compounds by a solvent or water. This ensures that the viscosity of the applied formulation is low and the pores may be filled up completely by the liquid. After evaporation of solvents or water the radiation curing compounds remain in the desired amount according to the dilution factor in the whole depth of the ink receptive layer in a homogeneous distribution.

The application of the formulation comprising the radiation curing compounds can be performed also in several steps meaning that it is applied in portions which may be dried by intermediate heat treatment if solvents or water is present in the formulation. In this case, preferably the radiation curing step (iii) takes place at the end of the coating processes, i.e. after all of the application steps.

Drying

The step of drying the mixture to remove the solvent(s) or water may be carried out using any conventional means of thermal drying known to those skilled in the art, including air drying, drying under elevated temperature, fan drying, impingment drying, Infrared radiation assisted drying and the like, without being limited to these.

Radiation Curing

Curing the polymerizable and/or crosslinkable compounds is performed after including or applying the radiation curing coating formulation into the (preferably already printed) ink receptive layer and after drying of optional solvent or water. It can be achieved by UV light, particularly by mercury medium or high-pressure lamps or LED lamps with high radiation intensity as they are commercially available for UV curing, e.g. on printing or coating machines. In the case of UV curing preferably a suitable photo initiator should be added to the formulation comprising the radiation curable compounds in order to start the polymerization reaction after the formulation comprising the curable compounds has penetrated into the microporous structure of the (printed) layer. Typical UV initiators are state-of-the art, e.g. Norrish type I photoinitiators or type II photoinitiators, like thioxanthone and its derivatives, or benzophenone and its derivatives. They may be combined with amine synergists. Examples for UV initiators are benzophenone, IRGACURE® 184 1-hydroxy-cyclohexyl-phenyl-ketone, IRGACURE® 651 alpha-alpha-dimethoxy-alpha-phenylacetophenone, IRGACURE® 369-aminoketone 2-benzyl-2-(dimethylamino)-1-[4-(4-morpholinyl)phenyl]-1-butanone, IRGACURE® 907 2-methyl-1-[4-(methylthio)phenyl]-2-(4-morpholinyl)-1-propanone, DAROCUR TPO diphenyl(2,4,6-trimethylbenzoyl phosphine oxide, IRGACURE® 819 phenyl bis(2,4,6-trimethyl benzoyl), IRGACURE® 2100 phosphine oxide derivative, IRGACURE® 784 bis(eta 5-2,4-cyclopentadien-1-yl)bis [2,6-difluoro-3-(1H-pyrrol-1-yl)phenyl]titanium, IRGACURE® 250 iodonium (4-methylphenyl) [4-(2-methylpropyl)phenyl]-hexafluorophosphate(1-) as offered by BASF. For water-based systems, water soluble or dispersible photoinitiators, e.g. IRGACURE® 500, can be used. The photoinitator or photoinitiator mixture and optional amine synergists are added to the formulation in a quantity of 0.5% to 5% by weight, preferably 1% to 3% by weight based on the radiation curable compounds. The UV radiation dose to achieve polymerization and crosslinking preferably is in the range of 300 to 3000 mJ/cm$^2$, more preferred in the range of 500 to 2500 mJ/cm$^2$. In order to lower the dose and avoid effects by oxygen inhibition it is preferred to perform the curing under inert atmosphere, e.g. under nitrogen or argon atmosphere, e.g. at oxygen levels below 200 ppm, preferably below 100 ppm.

Alternatively, electron beam curing can be performed to achieve radical polymerization of the radiation curable substance applied to the printed film. This technique allows fast inline coating and curing processes and is typically performed under inert gas during irradiation, e.g. at oxygen levels below 200 ppm, preferably below 100 ppm. The irradiation dose for curing is in the range of 5 kGy to 200 kGy, preferably in the range of 10 to 100 kGy.

Structure/Composition of the Inventive Flexible Film

The flexible film of the present invention comprises at least the polymer film (a) serving as a support for the ink receptive layer (b) and said ink receptive layer. However, the flexible film may further comprise several other layers providing the flexible film desired further properties. It should be understood that the mention of the optional layers/films of the inventive (inkjet printed) flexible film and the multilayer laminate is not exhaustive, i.e. further layers/films not specifically described herein may be present. For example, the multilayer laminate of the present invention can also comprise a second polymer film or a metal film.

These layers can be provided or laminated on/to the backside of the flexible film by any application (e.g. coating) or laminating process. For lamination it is possible to use conventional laminating adhesives, such as dry lamination with either aqueous (water-based) or solvent-based adhesives, solvent-free lamination with 1-component or 2-component adhesive systems, hot-melt lamination with hot-melt adhesives or extrusion glues, e.g. on the basis of polyolefins, and lamination with radiation-curable adhesives. Preferred adhesives are water-based or solvent-free adhesives on the basis of polymers or prepolymers such as poly(meth)acrylates and polyurethanes. The adhesive may contain additional components such as crosslinking agents, plasticizers, tackifiers, and colorants. The type of adhesive, including type and amount of additives, used for lamination depends on the intended use of the multilayer laminate.

The adhesive is typically applied in an amount of from 1 g/m$^2$ to 20 g/m$^2$, preferably from 2 g/m$^2$ bis 6 g/m$^2$.

When a polymer film or a metal foil is applied to the rear side of the polymer film (a) a corona treatment of the rear (non-coated side) of the polymer film is advantageous to improve adhesion.

It is understood that the above-mentioned additional layers, film and foils can be present in any feasible combination and sequence with the proviso that the layer is attached to the opposite side of the film bearing the printed microporous layer. Moreover, the inkjet printable or printed flexible film/multilayer laminate of the present invention may comprise further layers which are not specifically discussed herein. Examples include paper, cardboard, fabrics, nonwovens, metal foils, composites and combinations thereof.

Non-limiting exemplary sequences of layers of the inventive inkjet printed flexible film/multilayer laminate (adhesive layers in the multilayer laminates are not always shown) include:

--- water based ink jet printed color pigments and optional binding agents
Microporous ink-receptive layer (b) containing radiation cured compounds
polymer film (a)
water based ink jet printed color pigments containing radiation cured compounds
Microporous ink-receptive layer (b) containing radiation cured compounds
polymer film (a)
Radiation cured compounds
water based ink jet printed color pigments containing radiation cured compounds
Microporous ink-receptive layer (b) containing radiation cured compounds
polymer film (a)
water based ink jet printed color pigments containing radiation cured compounds
microporous ink-receptive layer (b) containing radiation cured compounds
adhesion promoting layer (c)
polymer film (a)
water based ink jet printed color pigments containing radiation cured compounds
microporous ink-receptive layer (b) containing radiation cured compounds
adhesion promoting layer (c)
polymer film (a)
adhesive layer
polymer film, metal foil or other flexible web material (e)
Radiation cured top coating
water based ink jet printed color pigments containing radiation cured compounds
microporous ink-receptive layer (b) containing radiation cured compounds
adhesion promoting layer (c)
polymer film (a)
Glue (e.g. dried polyurethane dispersion)
Rigid board

---

In preferred embodiments the total thickness of the ready-made flexible film, e.g. the inkjet printed flexible film, is within the range of from 50 to 700 μm, preferably from 60 to 500 μm, more preferably from 70 to 200 μm. The grammage of the inventive ready-made flexible film/multilayer laminate preferably ranges from 50 to 550 g/m$^2$, more preferably from 70 to 250 g/m$^2$. The thickness and the grammage of the inkjet printable flexible film/multilayer laminate can be determined according to ISO 534 and ISO 536, respectively.

When any additional layer(s) (e) (apart from any ink-receptive layer (b)) are present only on the rear of the polymer film (a), the ink receptive layer (b) of the inkjet printable flexible film/multilayer laminate can be printed before or after application of the additional layer(s) (e) in order to obtain the inventive printed flexible film.

Application/Use

The inkjet printed flexible film or multilayer laminate can be used to prepare a decorated end-product. For this purpose the printed flexible film or multilayer laminate may be applied to any substrate, support, surface or object which shall be decorated by the print provided by the printed flexible film. Examples for such a substrate, support, surface or object are a board, panel, wall, furniture, doors, flooring, ceiling, etc., whereas the flexible film can also be used e.g. for decorating cardboard boxes, cartons, chip boards, suitcase surfaces, containers or similar without being restricted to the mentioned applications. The inkjet printed flexible film or multilayer laminate can be processed to prepare the intended decorative end-product by standard operations including heat sealing, ultrasonic sealing, solvent sealing, pressure sealing, and gluing, e.g. by solvent or water based adhesives.

The inventive inkjet printed flexible film or multilayer laminate can also be further processed by applying an additional transparent surface coating or by a lamination process on top of the printed side of the flexible film or laminate, by processes including extrusion coating, e.g. by applying one of more layers or combinations, e.g. of polyurethanes, radiation curing layers or film laminates in order to apply a wear layer as an outer layer. This can be done onto the inventive flexible printed film or after applying the flexible film to a (rigid) substrate, support, surface or object.

In particular, the inventive inkjet printed flexible film and the multilayer laminate are suitable as a decorative layer in a board construction for applications in flooring, furniture, wall decoration or ceilings. The inventive printed flexible film can be easily laminated to a board covering the high quality ink jet print image and ensures mechanical resistance as well as water resistance to the final board application.

In case of colored, e.g. white, colored films preferably the non-printed side of the flexible film is attached to the rigid support, e.g. the board or panel.

There are further different applications for ink jet printed decor films, e.g.

proof and pattern development, where the print is evaluated as is or processed to the final laminate but is used only for evaluation of color, brilliance, print pattern etc., decor sample production, furniture tops for cupboards, cabinet and table tops. In this application the decor foil is covered with an EB/UV varnish, which offers a very good scratch protection. Furthermore, for floor panels: In this application, the decorative film is coated with an extruded, multi-layer film coating (up to 500 µm). The surface is embossed and the entire laminate is then laminated onto an MDF substrate. This application requires a very high adhesion measured as peel resistance of up to 50 N/25 mm. Decorated Doors, walls, ceilings, kitchen surfaces can be manufactured with the inventive decor film.

As can be seen in the above examples, the flexible decorative films preferably are laminated to manufacture rigid printed decorative panels, boards, plates such as so-called continuous pressure laminates (CPL) or high pressure laminates (HPL) or paint laminate or furniture foil.

Properties and Test Methods

Depending on the desired application of the printed flexible film different requirements have to be met, e.g. for laminate flooring they are described in the NALFA Certification. Parameters like static load, thickness swell, light resistance, cleanability and stain resistance, large ball resistance, small ball resistance, water resistance, dimension tolerance, castor chair resistance and surface bond are regarded as relevant.

For example, for the flexible film which will be part of a final laminate flooring construction the parameters water resistance and bond strength as well as light resistance are the critical parameters. In this approach a separate wear layer is typically applied to the surface of the flexible printed film, thus, this layer has to ensure the scratch and stain resistance of the final surface. Requirements for furniture application are defined e.g. in DIN 68861-1 to -8 as well as in IKEA specifications IOS.

Another demanding application for the inventive flexible films can be decorative furniture surfaces, e.g. for kitchens. Again, in this use the above-mentioned parameters water resistance, bond strength as well as light resistance as well as stain resistance to all kind of foodstuffs are considered as important for the inventive flexible printed film.

Test Methods:

Thickness is determined according to ISO 534 in µm. The Coating thickness in µm is measured as the thickness difference before and after coating.

The viscosity of the liquids and compositions is measured according to DIN EN ISO 2555:2018 using a Brookfield viscosimeter DV-II with spindle type L2 at 100 rpm at 20° C. for viscosities up to 300 mPas and at 12 rpm for viscosities above 300 mPas up to 2500 mPas using a 500 ml glas beaker without guardleg until a constant viscosity reading is reached.

The coating weight of the microporous ink receptive layer (b) as well as the coating weight of the polymerizable and/or crosslinkable (curable) compounds is determined gravimetrically by the difference in weight of the base polymer film (a), base film (a) with ink receptive layer (b), base film (a) with ink receptive layer (b) and ink jet print and base film (a) with ink receptive layer (b), ink jet print and radiation curable or radiation cured compounds.

The pore volume (porosity) of the ink-receptive layer (b) and the porosity of the flexible printed film is determined by contacting the ink-receptive layer of the film sample with 1-methoxy-2-propanol in order to fill the pores of the ink-receptive layer with the liquid and calculating the pore volume from the weight difference of the dry coating and the 1-methoxy-2-propanol saturated coating after removing excess liquid from the surfaces using a density of 0.92 g/cm$^3$ for the 1-methoxy-2-propanol. The porosity in ml/g can be determined according to the following definition: porosity of the layer=liquid uptake into pore volume in ml/m$^2$/coating weight of the microporous layer in g/m$^2$ The water absorption of the printed flexible film is measured in the same procedure as described for the pore volume evaluation except using a density of 1.0 g/cm$^3$.

The gloss of the ink-receptive coating and the printed film is determined according to ISO 2813 at an angle of 60 degrees in GU (gloss units).

The scratch resistance is determined by fixing 25 mm wide stripes of the printed flexible film, which has been immersed into water for 72 h at 23° C. followed by surface drying with a paper towel, at the edges by adhesive tapes with the printed side up onto a glass plate and scratching with an Ericksen pen, Model 318S with different increasing force settings in perpendicular vertical position to the film at a drawing speed of appr. 30 mm/s. The force is recorded which is just not leading to visibly scratches on the surface.

The print performance and print quality is evaluated by roll-to-roll printing with a KBA Rotajet digital press with KBA aqueous pigmented inks with low content of organic binding agent comprising Fujifilm Dimatix Samba printheads at a printing speed of 150 m/min with a resolution of 1200×1200 dpi. The maximum ink load is controlled by the software in order to avoid oversaturation of the ink jet coating. A test print is run to judge color gamut, color saturation, print sharpness and resolution as well as for artefacts like bleeding, blurring, mottling or coalescence. A rating of 1 to 5 is correlated to the quality of the print: 1=no print artefacts and high color gamut to 5=print with very visible artefacts and/or low color gamut.

The radiation curing dose in mJ/cm$^2$ in the curing step is evaluated using a dosimeter Aktiprint UV-Integrator from Technigraf which integrates the UV dose in a wavelength range of 320 to 420 nm. Alternatively, calibrated color strips can be used for UV dose evaluation and for dose control in kGy (Mrad) in electron beam curing.

The penetration depth in μm of the radiation curable/cured compounds in the printable or printed microporous ink receptive layer is investigated by SEM (Scanning Electron Microscopy, Jeol) in case that the compounds are applied before or after printing with aqueous pigmented inks by measuring the thicknesses of the total microporous layer, the portion which has been penetrated by the radiation curing/cured compounds which result in a different contrast due to filling up the porous structure and optionally excess radiation curing/cured compounds on top of the microporous layer. The penetration depth of the radiation curing compounds in % is referred to the whole thickness of the microporous coating.

The delamination strength of a composite of lamination film/test specimen/lamination film is evaluated by a peel adhesion test in order to investigate the interface adhesion and/or cohesive failure of the flexible film ("test specimen") structure under peel angle of 90°. Both sides are laminated with a heat sealing film (250 μm Dolphin Laminierfolie, F-320-250-57) by means of a laminator device DJ650 from S2-Laminiertechnik GmbH at 150° C. with standard pressure on the lamination rollers. A specimen of this laminate with 25 mm width and 250 mm length is fixed to a V2A panel by a double-sided adhesive tape with the printed film side facing the panel. Tensile testing is performed after minimum 24 hours storage at ambient conditions (23° C./50% r.h.) after preparation of the composite in a tensile testing machine (Lloyd instruments, LRK5plus) removing the upper laminated film in 90° direction to the web direction of the flexible film surface. The average force over a distance of 175 mm is measured applying a test speed of 1000 mm per minute by a tensile testing machine. Peel adhesion (90°) is expressed as the average result for the specimens tested in N per 25 mm width.

The failure mechanism is investigated by ATR-FTIR spectroscopy of the resulting peeled surfaces of the test specimen. By applying a strong force by removing the adhesive tape with 1000 mm/min speed the adhesion and cohesion failure of the flexible printed film can be determined. In case that the failure is between the adhesive and the specimen surface the force measured indicates that the specimen has a minimum cohesion and adhesion within its layers according to the measured force.

The delamination strength in the wet state is measured after preparing the composite as described in the delamination strength method described above and after immersion of this composite in water for 72 hours at 23° C.

Bending resistance is determined by wedge test for brittleness of the coating according to ISO 18907:2000 in mm with the wide tester. Low values indicate a low brittleness of the coating. This measurement correlates well to application requirements like flex crack resistance and flake of resistance.

The stability against UV light of printed film is evaluated in a Xenotest Alpha HE device with Xenon arc lamps with 320 nm glass filter at 40° C. and 40% r.h. with a black panel temperature of 50° C. at a radiation intensity of 100 W/m$^2$ for 1000 hours facing the printed side to the lamp with turning the specimen holders. The samples are compared before and after testing and rated for yellowing, colour fading or other visible issues like cracking. A rating of 1 to 5 is correlated to the quality of the printed sample: 1=no visible change to 5=print with very visible discolorationor mechanical issues like crack formation.

Abrasion resistance of circular samples (diameter 105 mm) of the printed film, which has been immersed into water for 72 h at 23° C. followed by surface drying with a paper towel, is investigated using a Taber abrasion tester with a CS10 wheel after 25 rounds. A rating of 1 to 5 is correlated to the visibility of surface change of the printed sample: 1=no visible change to 5=print image 50% removed.

EXAMPLES

Example 1

Preparation of an aqueous coating composition for the ink receptive layer (Coating Composition A1):

6 kg of 25 weight % of hydrochloric acid and 0.8 kg of boric acid were added to 500 l of water in a 2000 l vessel while stirring. Stirring was continued and 260 kg of boehmite (DISPERAL® HP 14, available from Sasol) were added slowly to obtain a dispersion of boehmite particles.

In a separate step, the binder solution was prepared by adding 27 kg of poly(vinyl alcohol) having a degree of hydrolysis of from 86.7 to 88.7 mol % and a 4 weight % aqueous solution viscosity of 38-42 mPas (Mowiol® 40-88, available from Kuraray) to 200 kg of cold water in a 400 l beaker while stirring. The suspension was heated to about 90° C. while stirring with a blade agitator until the poly (vinyl alcohol) was dissolved.

The still hot binder solution was poured into the boehmite dispersion under stirring. Cold water was added under stirring in order to adjust the total volume of the aqueous coating composition to 1000 l. It was stirred for further 30 minutes and temperature decreased to about 45° C.

The solid content of the dispersion was about 28.9% by weight with a boehmite to poly(vinyl alcohol) weight ratio of about 9.6:1.

Application of aqueous coating composition A1 to prepare the ink-receptive layer:

The treated surface of a 52 μm thick white BOPP film (Label-Lyte™ 52LLC247) with white core layer and two coextruded white layers on both surfaces, available from Jindal was subjected to a corona treatment.

The still warm aqueous coating composition A was applied uniformly to the corona-treated surface of the film using a curtain coater to obtain a wet coating weight of about 78 g/m$^2$. Afterwards, the coating was dried in forced air dryers at up to 100° C. to a dry coating weight of 22.5 g/m$^2$.

Then the coated film was printed using an KBA ink jet production printing machine with pigmented water-based inks comprising CRYK pigments dedicated for decor applications with a decorative dark oak decor. The print has been dried inline in the printing machine at appr. 80° C. at a speed of 80 m/min.

The so-prepared film is herein further determined being the "inkjet printed film".

Thereafter the following coating composition B1 (representing a "formulation comprising radiation curable compounds" as described above) was applied uniformly to the printed surface of the inkjet printed film using a lab film drawing device from Ericksen with a coating bar with a 20 μm gap with a speed of 3 m/min.

| | |
|---|---|
| UCECOAT ® 7210 aliphatic urethane eacrylate mulsion with 65% solid content[1] | 89 parts |
| Irgacure ® 500[2] | 1 part |
| Wetting agent | 0.1 part |
| Water | 9.9 parts |

[1] by Allnex
[2] Mixture of two photoinitiators, by BASF

Irgacure®, wetting agent and water were poured into the acrylate emulsion and stirred by a stirrer until homogeneous distribution was achieved. The viscosity for coating was measured and adapted to be 90 mPa*s. Said coating composition B1 was then applied uniformly on top of the printed ink receptive layer.

The coating has been dried by hot air at 80° C. for 10 min followed by UV curing with a dose of 1500 mJ/cm$^2$ by conveying the film on a moving belt under a medium pressure mercury UV lamp without inertisation.

The structure of the inkjet printed flexible film was as follows:

| | |
|---|---|
| water based ink jet printed pigments and binders 22 g/m$^2$ Microporous ink-receptive layer (b) containing 10.2 g/m$^2$ radiation cured compounds | |
| BOPP (biaxially oriented polypropylene film (a)) | 52 μm |

The obtained printed flexible film exhibits a high image quality, has excellent mechanical properties as well as excellent water resistance and can easily be processed for manufacturing of a laminate board. The evaluation results are shown in tab. 1.

Example 2

Onto the inkjet printed film described in example 1 the following coating composition B2 instead of coating composition B1 was applied uniformly to the printed surface of the film using a film drawing device from Erickson with a coating bar with a 80 μm gap with a speed of 3 m/min.

| | |
|---|---|
| Acrylated Polymethacrylate comprising OH-groups Ebecryl 1200 [1] (solution in MEK with 55% by weight solid content of the Polymethacrylate) | 45 parts |
| Irgacure ® 184 [2] | 0.5 parts |
| Polyurethane acrylate for adhesion promotion [3] | 1 parts |
| Curable wetting agent TEGO-rad 2010 [4] | 0.6 part |
| Polyisocyanate (Takenate D120 N) [5] | 1.3 parts |
| Isocyanato acrylate Laromer LR9000 [1] | 1 part |
| Methylethylketone (MEK) | 50.6 parts |

[1] by Allnex
[2] by BASF
[3] by Sartomer
[4] by Evonik
[5] by Mitsui Chemicals

Composition B2 has been prepared by adding the other components to a 55% solution of the acrylated polymethacrylate and stirring until a homogeneous clear solution has been achieved. The viscosity for coating was measured to be 40 mPa*s.

The coating has been dried by hot air at 80° C. for 10 min followed by UV curing with a dose of 2200 mJ/cm$^2$ by a medium pressure mercury UV device as described in example 1.

The structure of the inkjet printed flexible film was as follows:

| | |
|---|---|
| water based ink jet printed pigments and binders 22.5 g/m$^2$ Microporous ink-receptive layer (b) containing 12.8 g/m$^2$ radiation cured compounds | |
| BOPP (biaxially oriented polypropylene film (a)) | 52 μm |

The obtained printed flexible film exhibits a high image quality, has excellent mechanical properties as well as excellent water resistance and can easily be processed for manufacturing of a laminate board.

The evaluation results are shown in tab. 1.

Example 3

An inkjet printed film is produced according to example 2 but with a different aqueous coating composition for the ink receptive layer (Coating Composition A2):

6 kg of 25 weight % of hydrochloric acid, 2.2 kg of adipic acid dihydrazide and 0.8 kg of boric acid were added to 500 l of water in a 2000 l beaker while stirring. Stirring was continued and 234 kg of boehmite (DISPERAL® HP 14, available from Sasol) were added slowly to obtain a dispersion of boehmite particles.

In a separate step, the binder solution was prepared by adding 27 kg of poly(vinyl alcohol) Poval DF-20 of Japan Vam & Poval Ltd., which is copolymerized using diacetone acrylamid having a degree of hydrolysis of from 98 to 99 mol % and a 4 weight % aqueous solution viscosity of 25.5-31.5 mPa*s to 200 kg of cold water in a 400 l beaker while stirring. The suspension was heated to about 90° C. while stirring with a blade agitator until the poly(vinyl alcohol) was dissolved.

The still hot binder solution was poured into the boehmite dispersion under stirring. Cold water was added under stirring in order to adjust the total volume of the aqueous coating composition to 1000 l. It was stirred for further 30 minutes and temperature decreased to about 45° C.

The solid content of the dispersion was about 26.4% by weight with a boehmite to poly(vinyl alcohol) weight ratio of about 11.5:1. The coating is applied to the BOPP film in a dry coat weight of 18 g/m$^2$.

The obtained printed flexible film exhibits a high image quality, has excellent mechanical properties as well as excellent water resistance and can easily be processed for manufacturing of a laminate board.

The evaluation results are shown in tab. 1.

Comparative Example 1

An inkjet printed film is produced according to example 1 but was not further provided with any application of (meth)acrylated polymerizable and/or crosslinkable compounds into the microporous layer and without any UV curing.

The obtained printed flexible film exhibits a high image quality, but has low mechanical properties and no water resistance which disqualifies it to be processed for manufacturing of a laminate board.

The evaluation results are shown in tab. 1.

TABLE 1

| Ex.# | Ex. 1 | Ex. 2 | Ex. 3 | CEx. 1 |
|---|---|---|---|---|
| Base film | Label-Lyte 52LLC247 | Label-Lyte 52LLC247 | Label-Lyte 52LLC247 | Label-Lyte 52LLC247 |
| Base film producer | Jindal | Jindal | Jindal | Jindal |
| Thickness of base film in μm | 52 | 52 | 52 | 52 |
| Ink Jet Coating Composition | A1 | A1 | A2 | none |
| Coating thickness in μm | 22 | 22 | 17.5 | 22 |
| Coating weight g/m² of microporous coating | 22.5 | 22.5 | 18 | 22.5 |
| Gloss ink-receptive layer 60° in % | 80 | 80 | 76 | 80 |
| Print performance | 1 | 1 | 1 | 1 |
| Radiation curing coating formulation | B1 | B2 | B2 | none |
| Coating weight g/m² of radiation curable formulation | 10.2 | 12.8 | 6 | none |
| Radiation curing UV dose (in mJ/cm²) | 1500 | 1500 | 1800 | none |
| Weight % of radiation cured coating in microporous coating (calculated) | 45 | 59 | 33 | 0 |
| Penetration depth in μm (SEM on cross section) (μm) | 22 | 22 | 17.5 | |
| Scratch resistance Ericksen (N) | 7 | 6 | 6 | 3 |
| Resistance to abrasion | 1 | 2 | 1 | 5 |
| Water absorption (ml/g) | 0 | 0 | 0 | 0.8 |
| Wedge Test for Brittleness (mm) | 1 | 1 | 1 | 1 |
| Porosity (ml/g) | 0 | 0 | 0 | 0.6 |
| UV Light Stability | 1 | 1 | 1 | 3 |

"—" means not applicable

It is evident form the experimental data that only the inventive inkjet printed flexible films provide the desired combination of mechanical strength in dry and wet environment and good printability. Moreover, the crosslinking of PVA gives further improvement to the mechanical strength of the printed flexible film. This confirms that the inkjet printed flexible film can be used for decorative board applications.

What is claimed is:

1. An ink jet printed flexible film comprising:
   (a) a polymer film having a thickness in the range of from 30 to 500 μm;
   (b) at least one ink-receptive layer comprising inorganic particles and a binder, said at least one ink-receptive layer comprising pores; and
   (c) pigments of an inkjet ink,
   wherein said ink-receptive layer further comprises a cross-linked polymer of polymerizable and/or cross-linkable monomeric or polymeric compounds having at least one (meth)acrylate moiety in the amount of more than 6% by weight based on the weight of the ink-receptive layer in the pores of said at least one ink-receptive layer, wherein the cross-linked polymer is crosslinked via the (meth)acrylate moieties, and wherein said ink jet printed flexible film is formed by a method that comprises applying at least a portion of the polymerizable and/or crosslinkable monomeric or polymeric compounds to the ink receptive layer after the pigments of the inkjet ink have been applied to the at least one ink-receptive layer.

2. The flexible film according to claim 1, wherein said polymer film (a) is non-porous and the at least one ink receptive layer fulfills at least one of the following conditions:
   (i) the at least one ink receptive layer is a microporous layer comprising pores having a diameter of from 2 nm to less than 0.5 μm,
   (ii) the at least one ink receptive layer is a microporous layer having a porosity of at least 0.3 ml/g to 1.5 ml/g,
   (iii) the ratio of the weight amounts of inorganic particles to the binder is in the range of from 2:1 to 20:1,
   (iv) the dry coating weight of the at least one ink receptive layer is in the range of 5 to 30 g/m².

3. The flexible film according to claim 1, wherein said at least one ink receptive layer comprises the pigments of the inkjet ink on top of its surface.

4. The flexible film according to claim 1, wherein the pigments of the ink are in close contact with or even bound by the polymerizable and/or crosslinkable monomeric or polymeric compounds having at least one (meth)acrylate moiety or the polymer which is crosslinked via (meth) acrylate moieties.

5. The flexible film according to claim 1, wherein the inorganic particles fulfill at least one of the following:
   (i) the inorganic particles have a primary particle size of from 5 nm to 100 nm,
   (ii) the inorganic particles have an aggregate particle size in the range from 30 to 300 nm,
   (iii) the inorganic particles are selected from the group consisting of boehmite, alumina or silica particles,
   (iv) they have a BET surface of 100 to 350 m²/g.

6. The flexible film according to claim 1, wherein the binder is selected from polyvinyl alcohol and polyvinyl alcohol derivatives.

7. The flexible film according to claim 1, wherein the polymerizable and/or crosslinkable monomeric or polymeric compounds having (meth)acrylate moieties or the crosslinked polymer fulfill at least one of:
   (i) the polymerizable and/or crosslinkable monomeric or polymeric compounds or the crosslinked polymer are present in an amount of 10 to 60 weight % based on the weight of the ink receptive layer (b),
   (ii) the polymerizable and/or crosslinkable monomeric or polymeric compounds or the crosslinked polymer are present throughout the whole ink receptive layer (b),
   (iii) the polymerizable and/or crosslinkable compounds are polymerizable and/or crosslinkable by application of UV or electron beam radiation,
   (iv) the crosslinked polymer comprises said polymerized or crosslinked compounds as monomers.

8. The flexible film according to claim 1, wherein the polymerizable and/or crosslinkable compounds having at least one (meth)acrylate moiety are selected from the group consisting of:
   monomers selected from the group consisting of esters of (meth)acrylic acid with mono- or polyvalent alcohols which may be ethoxylated or propoxylated,
   prepolymers and polymers selected from the group consisting of polyester acrylates, epoxy acrylates, urethane acrylates, amine modified acrylates, silicone acrylates, (meth)acrylated poly(meth)acrylates, and
   crosslinked polymers that comprise the foregoing monomers, prepolymers and polymers.

9. The flexible film according to claim 1, wherein the polymer crosslinked via (meth)acrylate moieties is a product of radiation curing of at least one component with one or more (meth)acrylic moieties and one or more isocyanato groups or the polymer crosslinked via (meth)acrylate moieties comprises a reaction product of an isocyanate comprising component with an OH-group.

10. A method of manufacturing the film according to claim 1, said method comprising the steps of:
 (i) coating a polymer film having a thickness in the range of from 30 to 500 μm with a mixture comprising inorganic particles and a binder to provide at least one ink receptive layer(s) on the polymer film; and
 (ii) including or applying polymerizable and/or crosslinkable compounds having at least one (meth)acrylate moiety into pores of the ink receptive coating.

11. The method according to claim 10, wherein said method comprises further an additional step (iii), comprising
 (iii) polymerizing and/or crosslinking the (meth)acrylated compounds contained in or applied to the ink receptive layer by applying radiation energy to obtain a polymer crosslinked via (meth)acrylate moieties; and/or an additional step (iv), comprising
 (iv) applying an aqueous ink to the ink receptive layer, wherein step (iv) is carried out after step (i), but before step (ii) to prepare a printed flexible film.

12. The method according to claim 10, wherein at least one of the following is fulfilled:
 (a) the ink receptive layer is printed with a pigment-comprising aqueous inkjet ink before step (ii),
 (b) the polymerizable and/or crosslinkable compounds are applied onto the surface of the ink receptive layer after drying the ink receptive layer,
 (c) the radiation curing is performed by UV radiation of 300 to 3000 mJ/cm$^2$,
 (d) the radiation curing is performed by electron beam curing with a radiation dose of 5 kGy to 200 kGy,
 (e) the polymerization for forming the polymer crosslinked via (meth)acrylate moieties is initiated by UV light using a photo initiator,
 (f) the polymer crosslinked via (meth)acrylate moieties is obtained by radiation curing of (meth)acrylate comprising (meth)acrylic monomers or reactive diluents,
 (g) the polymer crosslinked via (meth)acrylate moieties is obtained by radiation curing of at least one component with 2 or more (meth)acrylic moieties,
 (h) the polymer crosslinked via (meth)acrylate moieties is obtained by radiation curing of at least one component with one or more (meth)acrylic moieties and one or more isocyanato groups,
 (i) the polymer crosslinked via (meth)acrylate moieties additionally comprises an isocyanate component which is thermally reactive or has reacted with an OH-group.

13. The method according to claim 10, wherein the polymerizable and/or crosslinkable compounds are applied to the ink receptive layer by use of a solvent based, water based or liquid undiluted compound formulation.

14. A laminate comprising the flexible film of claim 1.

15. A multilayer laminate comprising the flexible film of claim 1, said laminate being selected from the flexible laminate or a rigid laminate comprising a rigid substrate, support, surface or object laminated with the flexible film.

16. The flexible film according to claim 8, wherein said monomers are selected from the group consisting of isodecyl acrylate, cyclic trimethylolpropane formal acrylate, dihydrodicyclopentadienyl acrylate, 2-propylheptyl acrylate, 4-tert-butylcyclohexyl acrylate, ethyl-diglycol acrylate 2-(2-ethoxyethoxy)ethyl acrylate, phenoxyethyl acrylate, 1,6-hexanediol diacrylate (HDDA), dipropylene glycol diacrylate (DPGDA), tripropylene glycol diacrylate (TPGDA), propoxylated neopentyl glycol diacrylate, trimethylolpropane triacrylate (TMPTA), propoxylated glycerol triacrylate (GPTA), ethoxylated trimethylolpropane triacrylate, propoxylated trimethylolpropane triacrylate, amine modified polyether acrylate, ethoxylated pentaerythritol tetra acrylate (PPTTA); trimethylpropaneformal mono acrylate, phenoxyethyl acrylate, 4-t-butylcyclohexyl acrylate, tripropylenglycol diacrylate, oxyethylated phenol acrylate, monofunctional epoxyacrylate, phenoxyethyl acrylate, isobornyl acrylate (IBOA), octyl and decyl acrylate (ODA), polyethylene glycol 600 diacrylate, tricyclodecanediol diacrylate, propoxylated neopentyl glycol diacrylate, bisphenol A derivative diacrylates, trimethylolpropane ethoxy triacrylate, nonyl phenol [4 EO]acrylate, acrylated epoxy soy oil, bisphenol A epoxy diacrylate, trimethylpropane trimethacrylate (TMPTMA), isobornyl methacrylate, polyethylene glycol (200)di-methacrylate, lauryl methacrylate, acid functional acrylate, isocyanato acrylate with isocyanate and acrylic groups in one molecule, dipentaerythritol penta/hexaacrylate (DPHA), dipentaerythritol hexaacrylate, trimethylpropaneformal mono acrylate, 2-phenoxyethyl acrylate, 4-t-butylcyclohexyl acrylate, tripropylenglycol diacrylate, Tris(2-hydroxy ethyl) isocyanurate triacrylate, ethoxylated 2-phenoxyethyl acrylate, ethoxylated (4) nonylphenol acrylate, and ethoxylated trimethylol propane triacrylate.

17. The flexible film according to claim 8, wherein said prepolymers or polymers are selected from the group consisting of polyester acrylates, epoxy acrylates, urethane acrylates, amine modified polyether acrylates or silicone acrylates.

18. The flexible film according to claim 8, wherein said cross-linked polymers are selected from the group consisting of polyester (meth)acrylate, polyurethanes (meth)acrylate, polyethers (meth)acrylate (meth)acrylated poly(meth)acrylates and mixtures thereof.

19. A method of manufacturing the film according to claim 1, said method comprising the steps of:
 coating the polymer film with a mixture comprising the inorganic particles and the binder to provide the at least one ink receptive layer on the polymer film;
 applying the pigments of the inkjet ink to the ink receptive layer; and
 applying at least a portion of the polymerizable and/or crosslinkable monomeric or polymeric compounds to the ink receptive layer after the pigments of the inkjet ink have been applied to the at least one ink-receptive layer.

20. The method of claim 19, wherein all the polymerizable and/or crosslinkable monomeric or polymeric compounds are applied to the ink receptive layer after the pigments of the inkjet ink have been applied to the at least one ink-receptive layer.

* * * * *

UNITED STATES PATENT AND TRADEMARK OFFICE
CERTIFICATE OF CORRECTION

| | | |
|---|---|---|
| PATENT NO. | : 12,257,855 B2 | |
| APPLICATION NO. | : 17/595294 | |
| DATED | : March 25, 2025 | |
| INVENTOR(S) | : Arthur Reiners et al. | |

It is certified that error appears in the above-identified patent and that said Letters Patent is hereby corrected as shown below:

In the Specification

Column 6, Line 17, delete "coat laquer, e.g." and insert -- coat lacquer, e.g. --.

Column 6, Line 17, delete "curable laquer or" and insert -- curable lacquer or --.

Column 6, Line 18, delete "by co-extrudion of" and insert -- by co-extrusion of --.

Column 6, Line 22, delete "(one-dimensonal) and" and insert -- (one-dimensional) and --.

Column 7, Line 11 (approx.), delete "at Tagleef under" and insert -- at Taghleef under --.

Column 7, Line 20, delete "UV stablilisationfeatures." and insert -- features. UV stabilization features. --.

Column 8, Line 28, delete "layers, laquer layer(s)," and insert -- layers, lacquer layer(s), --.

Column 9, Line 32, delete "($Al_2O_3 * \times H_2O(1.0<\times<2.0)$)." and insert -- ($Al_2O_3 * \times H_2O(1.0<\times<2.0)$)). --.

Column 9, Line 53, delete "or Cilias instruments" and insert -- or Cialis instruments --.

Column 10, Line 19, delete "from Evonik.Particularly, Aerodisp®" and insert -- from Evonik. Particularly, Aerodisp® --.

Column 11, Line 28 (approx.), delete "e.g. zirkonates or" and insert -- e.g. zirconates or --.

Column 13, Line 35, delete "Ucecoat®), BASF(Laromer®), Arkema" and insert -- Ucecoat®), BASF (Laromer®), Arkema --.

Signed and Sealed this
Twelfth Day of August, 2025

Coke Morgan Stewart
*Acting Director of the United States Patent and Trademark Office*

CERTIFICATE OF CORRECTION (continued)
U.S. Pat. No. 12,257,855 B2

Column 13, Line 36, delete "Covestro (Bayhydro®), DSM" and insert -- Covestro (Bayhydrol®), DSM --.

Column 13, Line 37, delete "DSM (AgiSyn™,NeoRad™), IGM" and insert -- DSM (AgiSyn™, NeoRad™), IGM --.

Column 13, Line 51-52, delete "ethoxylated (3.0)trimethylolpropane" and insert -- ethoxylated (3.0) trimethylolpropane --.

Column 13, Line 52, delete "propoxylated (3.5)trimethylolpropane" and insert -- propoxylated (3.5) trimethylolpropane --.

Column 14, Line 2, delete "glycol (200)di-methacrylate," and insert -- glycol (200) di-methacrylate, --.

Column 14, Line 21, delete "types P043F, LR8967" and insert -- types PO43F, LR8967 --.

Column 14, Line 25, delete "and PR021252, aliphatic" and insert -- and PRO21252, aliphatic --.

Column 15, Line 17-20, delete "glycol (200)di-methacrylate, polyethylene glycol (400)di-methacrylate, polyethylene glycol (600)di-methacrylate and Sartomer® CN92455, AgiSyn™ 2834 polyethyleneglycol (400)diacrylate," and insert -- glycol (200) di-methacrylate, polyethylene glycol (400) di-methacrylate, polyethylene glycol (600) di-methacrylate and Sartomer® CN92455, AgiSyn™ 2834 polyethyleneglycol (400) diacrylate, --.

Column 15, Line 41, delete "PR021596 can be" and insert -- PRO21596 can be --.

Column 18, Line 19, delete "boron oxid (reacting" and insert -- boron oxide (reacting --.

Column 22, Line 52, delete "glycol monoethylethe,; polyol" and insert -- glycol monoethylether, polyol --.

Column 22, Line 53, delete "2-pyrolidone," and insert -- 2-pyrrolidone, --.

Column 22, Line 53, delete "2-pyrolidone," and insert -- 2-pyrrolidone, --.

Column 22, Line 54, delete "2-pyrolidone," and insert -- 2-pyrrolidone, --.

Column 23, Line 20-21, delete "(Prosper®, Versamark®, Canon (Océ VarioPrint), KBA)(RotaJet®), Palis" and insert -- (Prosper®, Versamark®), Canon (Oce VarioPrint), KBA (RotaJet®), Palis --.

Column 28, Line 60, delete "drying, impingment drying," and insert -- drying, impingement drying, --.

Column 29, Line 28, delete "The photoinitator or" and insert -- The photoinitiator or --.

CERTIFICATE OF CORRECTION (continued)
U.S. Pat. No. 12,257,855 B2

Column 32, Line 31, delete "mlglas beaker without guardleg until" and insert -- ml glass beaker without guard leg until --.

Column 34, Line 17 (approx.), delete "visible discolorationor mechanical" and insert -- visible discoloration or mechanical --.

Column 34, Line 20, delete "mm) ofthe printed" and insert -- mm) of the printed --.

Column 35, Line 15, delete "urethane eacrylate mulsion with" and insert -- urethane acrylate emulsion with --.

Column 35, Line 61, delete "lsocyanato acrylate" and insert -- Isocyanato acrylate --.

Column 36, Line 40, delete "acrylamid having" and insert -- acrylamide having --.

In the Claims

Column 40, Line 5, Claim 16, delete "acrylate, ethyl-diglycol acrylate" and insert -- acrylate, ethyldiglycol acrylate --.

Column 40, Line 22, Claim 16, delete "phenol [4 EO]acrylate," and insert -- phenol [4 EO] acrylate, --.

Column 40, Line 25, Claim 16, delete "glycol (200)di-methacrylate," and insert -- glycol (200) di-methacrylate, --.

Column 40, Line 43-44, Claim 18, delete "poly(meth)acrylates and" and insert -- poly (meth)acrylates and --.